(12) United States Patent
Stanev et al.

(10) Patent No.: US 8,204,931 B2
(45) Date of Patent: *Jun. 19, 2012

(54) SESSION MANAGEMENT WITHIN A MULTI-TIERED ENTERPRISE NETWORK

(75) Inventors: Georgi Stanev, Sofia (BG); Galin Galchev, Sofia (BG)

(73) Assignee: SAP AG, Walldorf (DE)

( * ) Notice: Subject to any disclaimer, the term of this patent is extended or adjusted under 35 U.S.C. 154(b) by 1351 days.

This patent is subject to a terminal disclaimer.

(21) Appl. No.: 11/025,200

(22) Filed: Dec. 28, 2004

(65) Prior Publication Data

US 2006/0143217 A1    Jun. 29, 2006

(51) Int. Cl.
*G06F 15/16* (2006.01)
(52) U.S. Cl. ...................................... 709/203
(58) Field of Classification Search .................. 709/203
See application file for complete search history.

(56) References Cited

U.S. PATENT DOCUMENTS

| | | | |
|---|---|---|---|
| 5,274,804 A | 12/1993 | Jackson et al. | |
| 5,692,193 A | 11/1997 | Jagannathan et al. | |
| 5,805,790 A | 9/1998 | Nota et al. | |
| 5,835,724 A * | 11/1998 | Smith | 709/227 |
| 5,870,742 A | 2/1999 | Chang et al. | |
| 5,884,316 A | 3/1999 | Bernstein et al. | |
| 5,887,141 A | 3/1999 | Trugman | |
| 5,933,601 A | 8/1999 | Fanshier et al. | |
| 5,966,127 A | 10/1999 | Yajima | |
| 6,047,295 A | 4/2000 | Endicott et al. | |
| 6,098,093 A | 8/2000 | Bayeh et al. | |
| 6,144,991 A | 11/2000 | England | |
| 6,216,152 B1 | 4/2001 | Wong et al. | |
| 6,338,089 B1 | 1/2002 | Quinlan | |
| 6,339,782 B1 | 1/2002 | Gerard et al. | |
| 6,389,460 B1 | 5/2002 | Stewart et al. | |
| 6,502,148 B1 | 12/2002 | Krum | |
| 6,523,027 B1 | 2/2003 | Underwood | |

(Continued)

FOREIGN PATENT DOCUMENTS

EP    1387262 A1    2/2004

(Continued)

OTHER PUBLICATIONS

"U.S. Appl. No. 11/025,316, Non-Final Office Action mailed Jul. 21, 2009", 9 pgs.

(Continued)

*Primary Examiner* — Ryan Jakovac
(74) *Attorney, Agent, or Firm* — Schwegman, Lundberg & Woessner, P.A.

(57) ABSTRACT

A system and method are described in which session objects are organized and managed within a structured hierarchy of session object storage units, referred to herein as "session domains." The session domains store session objects sharing one or more related characteristics. In one embodiment, a separate hierarchy of session domains is implemented within each layer of an enterprise application server. For example, in a Java 2 Enterprise Edition ("J2EE") environment, a separate set of hierarchically-arranged session domains are generated for the EJB container, the Web container and the portal container. In addition, in one embodiment of the invention, the lifecycles of each of the session objects are managed based on the relationships between each of the session objects. The relationships may either be explicit or implicit. In the latter case, one embodiment of the invention detects the relationship, automatically declares the relationship, and uses the relationship to manage the lifecycle of the related sessions.

40 Claims, 18 Drawing Sheets

U.S. PATENT DOCUMENTS

| | | | |
|---|---|---|---|
| 6,539,445 B1 | 3/2003 | Krum | |
| 6,654,765 B2 | 11/2003 | Wong et al. | |
| 6,675,214 B2 | 1/2004 | Stewart et al. | |
| 6,721,777 B1 | 4/2004 | Sharma | |
| 6,751,797 B1 | 6/2004 | Desgranges et al. | |
| 6,763,440 B1 | 7/2004 | Traversat et al. | |
| 6,842,770 B1 | 1/2005 | Serlet et al. | |
| 6,854,115 B1 | 2/2005 | Traversat et al. | |
| 6,938,085 B1 | 8/2005 | Belkin et al. | |
| 6,941,307 B2 | 9/2005 | Papanikolaou et al. | |
| 6,950,822 B1* | 9/2005 | Idicula et al. | 707/10 |
| 7,013,329 B1 | 3/2006 | Paul et al. | |
| 7,127,713 B2 | 10/2006 | Davis et al. | |
| 7,139,792 B1 | 11/2006 | Mishra et al. | |
| 7,165,241 B2 | 1/2007 | Manda et al. | |
| 7,167,917 B2 | 1/2007 | Creamer et al. | |
| 7,174,363 B1 | 2/2007 | Goldstein et al. | |
| 7,177,823 B2 | 2/2007 | Lam et al. | |
| 7,184,922 B2 | 2/2007 | Ousley et al. | |
| 7,185,096 B2* | 2/2007 | Kalyanavarathan et al. | 709/226 |
| 7,197,568 B2 | 3/2007 | Bourne et al. | |
| 7,203,944 B1 | 4/2007 | van Rietschote et al. | |
| 7,231,435 B2 | 6/2007 | Ohta | |
| 7,254,634 B1* | 8/2007 | Davis et al. | 709/228 |
| 7,266,616 B1 | 9/2007 | Munshi et al. | |
| 7,277,935 B2 | 10/2007 | Sato | |
| 7,296,267 B2 | 11/2007 | Cota-Robles et al. | |
| 7,302,423 B2 | 11/2007 | De Bellis | |
| 7,302,609 B2 | 11/2007 | Matena et al. | |
| 7,308,501 B2 | 12/2007 | DeLima et al. | |
| 7,373,661 B2 | 5/2008 | Smith et al. | |
| 7,406,692 B2 | 7/2008 | Halpern et al. | |
| 7,409,709 B2 | 8/2008 | Smith et al. | |
| 7,418,560 B2 | 8/2008 | Wintergerst | |
| 7,421,495 B2 | 9/2008 | Yang et al. | |
| 7,444,644 B1 | 10/2008 | Slaughter et al. | |
| 7,467,162 B2 | 12/2008 | Rosenbloom et al. | |
| 7,543,051 B2* | 6/2009 | Greifeneder et al. | 709/224 |
| 7,761,435 B2 | 7/2010 | Stanev et al. | |
| 7,853,698 B2 | 12/2010 | Stanev et al. | |
| 8,015,561 B2 | 9/2011 | Stanev | |
| 8,024,566 B2 | 9/2011 | Stanev | |
| 2001/0054004 A1 | 12/2001 | Powers | |
| 2002/0046304 A1 | 4/2002 | Fabri et al. | |
| 2002/0078060 A1 | 6/2002 | Garst et al. | |
| 2002/0078192 A1 | 6/2002 | Kopsell et al. | |
| 2002/0116505 A1* | 8/2002 | Higgins et al. | 709/227 |
| 2002/0143958 A1 | 10/2002 | Montero et al. | |
| 2002/0152429 A1 | 10/2002 | Bergsten et al. | |
| 2002/0165909 A1 | 11/2002 | Martin et al. | |
| 2002/0188678 A1* | 12/2002 | Edecker et al. | 709/204 |
| 2002/0198923 A1 | 12/2002 | Hayes | |
| 2003/0014521 A1 | 1/2003 | Elson et al. | |
| 2003/0014525 A1 | 1/2003 | DeLima et al. | |
| 2003/0018707 A1 | 1/2003 | Flocken | |
| 2003/0018717 A1 | 1/2003 | Haley et al. | |
| 2003/0033344 A1 | 2/2003 | Abbott et al. | |
| 2003/0074580 A1* | 4/2003 | Knouse et al. | 713/201 |
| 2003/0084248 A1 | 5/2003 | Gaither et al. | |
| 2003/0135509 A1 | 7/2003 | Davis et al. | |
| 2003/0154239 A1 | 8/2003 | Davis et al. | |
| 2003/0167333 A1 | 9/2003 | Kumar et al. | |
| 2003/0177382 A1 | 9/2003 | Ofek et al. | |
| 2003/0212654 A1 | 11/2003 | Harper et al. | |
| 2003/0229529 A1 | 12/2003 | Mui et al. | |
| 2004/0024971 A1 | 2/2004 | Bogin et al. | |
| 2004/0049673 A1* | 3/2004 | Song et al. | 713/150 |
| 2004/0068554 A1 | 4/2004 | Bales et al. | |
| 2004/0098726 A1 | 5/2004 | Currie et al. | |
| 2004/0117486 A1 | 6/2004 | Bourne et al. | |
| 2004/0153509 A1 | 8/2004 | Alcorn et al. | |
| 2004/0172618 A1 | 9/2004 | Marvin | |
| 2004/0181537 A1 | 9/2004 | Chawla et al. | |
| 2004/0205162 A1 | 10/2004 | Parikh et al. | |
| 2004/0210500 A1 | 10/2004 | Sobel et al. | |
| 2004/0221261 A1* | 11/2004 | Blevins | 717/107 |
| 2004/0250248 A1 | 12/2004 | Halpern et al. | |
| 2005/0086656 A1 | 4/2005 | Whitlock et al. | |
| 2005/0246714 A1* | 11/2005 | Moore et al. | 719/315 |
| 2005/0256880 A1 | 11/2005 | Nam Koong et al. | |
| 2005/0278270 A1 | 12/2005 | Carr et al. | |
| 2005/0278278 A1 | 12/2005 | Petev | |
| 2005/0278341 A1 | 12/2005 | Kostadinov et al. | |
| 2005/0278346 A1 | 12/2005 | Shang et al. | |
| 2005/0283585 A1 | 12/2005 | Sexton et al. | |
| 2005/0289536 A1 | 12/2005 | Nayak et al. | |
| 2006/0026286 A1 | 2/2006 | Lei et al. | |
| 2006/0029054 A1 | 2/2006 | Breh et al. | |
| 2006/0036448 A1 | 2/2006 | Haynie et al. | |
| 2006/0036617 A1 | 2/2006 | Bastawala et al. | |
| 2006/0047974 A1 | 3/2006 | Alpern et al. | |
| 2006/0053087 A1 | 3/2006 | Pavlov | |
| 2006/0053112 A1 | 3/2006 | Chitkara et al. | |
| 2006/0089992 A1 | 4/2006 | Blaho et al. | |
| 2006/0130063 A1 | 6/2006 | Kilian et al. | |
| 2006/0143217 A1 | 6/2006 | Stanev et al. | |
| 2006/0143328 A1 | 6/2006 | Fleischer et al. | |
| 2006/0143387 A1 | 6/2006 | Petev et al. | |
| 2006/0143389 A1 | 6/2006 | Kilian et al. | |
| 2006/0143608 A1 | 6/2006 | Dostert et al. | |
| 2006/0143609 A1 | 6/2006 | Stanev | |
| 2006/0155756 A1 | 7/2006 | Stanev | |
| 2006/0155867 A1 | 7/2006 | Kilian et al. | |
| 2006/0206856 A1 | 9/2006 | Breeden et al. | |
| 2006/0235810 A1 | 10/2006 | Wen et al. | |
| 2006/0236306 A1 | 10/2006 | DeBruin et al. | |
| 2006/0248036 A1 | 11/2006 | Stanev et al. | |
| 2006/0248119 A1 | 11/2006 | Stanev et al. | |
| 2006/0248198 A1 | 11/2006 | Galchev | |
| 2006/0248199 A1 | 11/2006 | Stanev | |
| 2006/0248200 A1 | 11/2006 | Stanev | |
| 2006/0248283 A1 | 11/2006 | Galchev et al. | |
| 2006/0248350 A1 | 11/2006 | Stanev | |
| 2006/0271586 A1 | 11/2006 | Federighi et al. | |
| 2007/0118538 A1 | 5/2007 | Ahern et al. | |
| 2007/0226683 A1 | 9/2007 | Stoodley et al. | |
| 2007/0245167 A1 | 10/2007 | De La Cruz et al. | |
| 2007/0250779 A1 | 10/2007 | Wallach et al. | |
| 2007/0255722 A1 | 11/2007 | Leffert et al. | |
| 2007/0261043 A1 | 11/2007 | Ho et al. | |
| 2008/0086564 A1* | 4/2008 | Putman et al. | 709/227 |
| 2008/0163063 A1 | 7/2008 | Bonev | |
| 2008/0201417 A1 | 8/2008 | McCain et al. | |
| 2008/0222270 A1 | 9/2008 | Gilbert | |

FOREIGN PATENT DOCUMENTS

| | | |
|---|---|---|
| WO | WO-00/23898 | 4/2000 |
| WO | WO 00/23898 | 4/2000 |
| WO | WO-03073204 A2 | 9/2003 |
| WO | WO-2004038586 A2 | 5/2004 |

OTHER PUBLICATIONS

"U.S. Appl. No. 11/025,549, Preliminary Amendment filed Mar. 21, 2005", 4 pgs.

"U.S. Appl. No. 11/025,549, Response filed Jun. 24, 2009 to Non Final Office Action mailed Mar. 24, 2009", 9 pgs.

"U.S. Appl. No. 11/118,020, Response filed May 26, 2009 to Non Final Office Action mailed Feb. 24, 2009", 12 pgs.

"U.S. Appl. No. 11/118,890, Final Office Action mailed May 6, 2009", 10 pgs.

"U.S. Appl. No. 11/118,890, Non Final Office Action mailed Sep. 18, 2008", 8 pgs.

"U.S. Appl. No. 11/118,890, Response filed Jan. 20, 2009 to Non Final Office Action mailed Sep. 18, 2008", 18 pgs.

"U.S. Appl. No. 11/118,976, Advisory Action mailed Mar. 30, 2009", 3 pgs.

"U.S. Appl. No. 11/118,976, Final Office Action mailed Feb. 3, 2009", 17 pgs.

"U.S. Appl. No. 11/118,976, Final Office Action mailed Feb. 21, 2008", 15 pgs.

"U.S. Appl. No. 11/118,976, Non Final Office Action mailed Aug. 21, 2008", 17 pgs.

"U.S. Appl. No. 11/118,976, Non Final Office Action mailed Aug. 31, 2007", 14 pgs.

"U.S. Appl. No, 11/118,976, Non-Final Office Action mailed Jun. 11, 2009", 22 pgs.
"U.S. Appl. No. 11/118,976, Response filed May 23, 2008 to Final Office Action mailed Feb. 21, 2008", 11 pgs.
"U.S. Appl. No. 11/118,976, Response filed Nov. 21, 2008 to Non Final Office Action mailed Aug. 21, 2008", 13 pgs.
*Virtual Machine Container: Unbreakable Java*, (2003).
"U.S. Appl. No. 11/025,316, Response filed Oct. 21, 2009 to Non Final Office Action mailed Jul. 21, 2009", 10 pgs.
"U.S. Appl. No. 11/025,549, Final Office Action mailed Nov. 4, 2009", 9 Pgs.
"U.S. Appl. No. 11/025,549, Response filed Jan. 4, 2010 to Final Office Action mailed Nov. 4, 2009", 13 pgs.
"U.S. Appl. No. 11/117,993, Non Final Office Action mailed Sep. 21, 2009", 11 pgs.
"U.S. Appl. No. 11/118,018, Non Final Office Action mailed Oct. 20, 2009", 26 pgs.
"U.S. Appl. No. 11/118,018, Response filed Jan. 19, 2010 to Non Final Office Action mailed Oct. 20, 2009", 11 pgs.
"U.S. Appl. No. 11/118,890, Advisory Action mailed Sep. 14, 2009", 3 pgs.
"U.S. Appl. No. 11/118,890, Non-Final Office Action mailed Dec. 24, 2009", 10 Pgs.
"U.S. Appl. No. 11/118,890, Response filed Sep. 2, 2009 to Final Office Action mailed May 6, 2009", 11 pgs.
"U.S. Appl. No. 11/118,976, Non-Final Office Action mailed Dec. 8, 2009.", 24 pgs.
"U.S. Appl. No. 11/118,976, Response filed Mar. 19, 2009 to Final Office Action mailed Feb. 3, 2009", 11 pgs.
"U.S. Appl. No. 11/118,976, Response filed Sep. 9, 2009 to Non Final Office Action mailed Jun. 11, 2009", 18 pgs.
"U.S. Appl. No. 11/118,976, Response filed Nov. 30, 2007 to Non Final Office Action mailed Aug. 31, 2007", 13 pgs.
"U.S. Appl. No. 11/406,738, Response filed Dec. 16, 2009 to Non Final Office Action mailed Sep. 21, 2009", 15 pgs.
"U.S. Appl. No. 11/647,979, Final Office Action mailed Jul. 8, 2009", 11 pgs.
"U.S. Appl. No. 11/647,979, Final Office Action mailed Oct. 2, 2009", 11 pgs.
"U.S. Appl. No. 11/647,979, Non Final Office Action mailed Feb. 19, 2009", 7 pgs.
"U.S. Appl. No. 11/647,979, Non-Final Office Action mailed Feb. 2, 2010", 9 pgs.
"U.S. Appl. No. 11/647,979, Response filed Apr. 8, 2009 to Non Final Office Action mailed Feb. 19, 2009", 14 pgs.
"U.S. Appl. No. 11/647,979, Response filed Sep. 9, 2009 to Final Office Action mailed Jul. 8, 2009", 12 pgs.
"U.S. Appl. No. 11/647,979, Response filed Dec. 22, 2009 to Final Office Action mailed Oct. 2, 2009", 15 pgs.
"International Application Serial No. PCT/EP2007/010882, International Search Report & Written Opinion dated Jul. 5, 2008", 10 pgs.
"SAP Transactions and the VM Container & Resource Management in the VM Container, printed", (Sep. 12, 2009).
De Pauw, W, et al., "Web Services Navigator: Visualizing the Execution of Web Services", *IBM Systems Journal*, vol. 44, No. 4, (2005), 821-845.
De Pauw, Wim, et al., "Visualizing the Execution of Java Programs", *Software Visualization, International Seminar, Revised Papers, Lecture Notes in Computer Science*, vol. 2269, XP002477230, ISBN: 3-540-43323-6, (2002), 151-162.
Gilberg, R. F., "Data Structures: A Pseudocode Approach Technology with C", *Thomson Course Technology 310340*, XP002477259, (May 31, 2006), 488-491.
Horton, Ivor, "Beginning Java 2", *WROX Press*, (1999), 36, 40, 58, 66.
Kirby, Graham, et al., "OCB: An Object/Class Browser for Java", *Proceedings of the Second International Workshop on Persistence and Java (PJW2)*, [Online]. Retrieved from the Internet: <URL: http://ftp.ncnu.edu/tw/JavaDownload/Docs/Persistence/Com.sun.labs.forest.pjava.pjw2_pdf.pdf>, (Aug. 1997), 89-105.
Mitchell, Nick, "The Runtime Structure of Object Ownership", *Object-Oriented Programming Lecture Notes in Computer Science,*
*ECCOP, LNCS, Springer-Verlag Berlin Heidelberg*, XP019041424, ISBN: 978-3-540-35726-1, (Sep. 2006), 74-98.
Parnas, Dagfinn, "SAP Virtual Machine Container", [Online]. Retrieved from the Internet: <URL: https://weblogs.sdn.sap.com/pub/wig/940>, (Oct. 23, 2004), 4 pgs.
Potanin, Alex, et al., "Scale-Free Geometry in OO Programs", *Communications of the ACM*, XP002478203; ISSN: 0001-0782, (May 2005), 99-103.
Salah, Maher M., "An Environment for Comprehending the Behavior of Software Systems", *Drexel University*, XP002477233, (Jun. 2005), 1-158.
Smith, M. P., et al., "Providing a User Customizable Tool for Software Visualization at Runtime", *Fourth Iasted International Conference on Visualization, Imaging, and Image Processing Acta Press*, XP002477257, ISBN: 0-88986-454-3, (2004), 135-140.
Smith, M. P., et al., "Runtime Visualisation of Object Oriented Software", *Proceedings First International Workshop on Visualising Software for Understanding and Analysis*, XP002477258, ISBN: 0-7695-1662-9, (2002), 81-89.
Smith, Michael P., et al., "Identifying Structural Features of Java Programs by Analysing the Interaction of Classes at Runtime", *2005 3rd IEEE International Workshop on Visualizing Software for Understanding and Analysis (IEEE Cat. No. 05EX1225)*, XP002477232, ISBN: 0-7-803-9540-9, (2005), 108-113.
Smits, Thomas, "Unbreakable Java—The Java Server that Never Goes Down", *Article, SAP TechED, San Diego and Munich*, (Nov. 2004), 1-5.
Zimmermann, Thomas, et al., "Visualizing Memory Graphs", *Springer-Verlag Berlin Heidelberg; S. Diehl (Ed): Software Visualization,*, XP002478204, LNCS 2269, (2002), 191-204.
"U.S. Appl. No. 11/025,316, Final Office Action mailed Feb. 23, 2010", 11 pgs.
"U.S. Appl. No. 11/025,316, Response filed Apr. 6, 2010 to Final Office Action mailed Feb. 23, 2010", 9 pgs.
"U.S. Appl. No. 11/117,851, Non-Final Office Action mailed Mar. 17, 2010", 17 pgs.
"U.S. Appl. No. 11/118,018, Final Office Action mailed Apr. 9, 2010", 29 pgs.
"U.S. Appl. No. 11/118,890, Pre-Appeal Brief Request mailed Mar. 24, 2010", 5 pgs.
"U.S. Appl. No. 11/118,976, Notice of Allowance mailed May 17, 2010", 18 pages.
"U.S. Appl. No. 11/118,976, Response filed Mar. 8, 2010 to Non Final Office Action mailed Dec. 8, 2009", 20 pgs.
"U.S. Appl. No. 11/647,979, Response filed Apr. 23, 2010 to Non Final Office Action mailed Feb. 2, 2010", 13 pgs.
"U.S. Appl. No. 11/117,851, Response filed Jun. 16, 2010 to Non Final Office Action mailed Mar. 17, 2010", 17 pgs.
"U.S. Appl. No. 11/117,993, Final Office Action mailed Jun. 23, 2010", 18 pgs.
"U.S. Appl. No. 11/118,018, Response filed Jun. 16, 2010 to Final Office Action mailed Apr. 9, 2010", 11 pgs.
"U.S. Appl. No. 11/118,890, Appeal Brief filed Jun. 21, 2010", 21 pgs.
"U.S. Appl. No. 11/647,979, Final Office Action mailed Jun. 28, 2010", 10 pgs.
"U.S. Appl. No. 11/025,316 Non-Final Office Action mailed Sep. 3, 2010", 19 pgs.
"U.S. Appl. No. 11/117,851 Restriction Requirement mailed Sep. 1, 2010", 6 pgs.
"U.S. Appl. No. 11/117,851, Response filed Sep. 28, 2010 to Restriction Requirement mailed Sep. 1, 2010", 8 pgs.
"U.S. Appl. No. 11/117,993 Notice of Allowance mailed Sep. 20, 2010", 7 pgs.
"U.S. Appl. No. 11/117,993, Response filed Aug. 23, 2010 to Final Office Action mailed Jun. 23, 2010", 9 pgs.
"U.S. Appl. No. 11/118,018, Non-Final Office Action mailed Jul. 9, 2010", 27 pgs.
"U.S. Appl. No. 11/118,018, Response filed Oct. 4, 2010 to Non Final Office Action mailed Jul. 9, 2010", 13 pgs.
"U.S. Appl. No. 11/647,979, Response filed Aug. 18, 2010 to Final Office Action mailed Jun. 28, 2010", 16 pgs.

Jipping, Michael J, et al., "Using Java to teach networking concepts with a programmable network sniffer", SIGCSE Bull. 35, 1, 001=http://doi.acm.org/10.1145/792548.611948, (Jan. 2003), 120-124.

"U.S. Appl. No. 11/025,316, Examiner Interview Summary mailed May 3, 2011", 1 pg.

"U.S. Appl. No. 11/025,316, Flnal Office Action mailed Feb. 17, 2011", 19 pgs.

"U.S. Appl. No. 11/025,316, Notice of Allowance mailed May 3, 2011", 11 pgs.

"U.S. Appl. No. 11/025,316, Response filed Dec. 1, 2010 to Non Final Office Action mailed Sep. 3, 2010", 18 pgs.

"U.S. Appl. No. 11/025,316, Response filed Apr. 12, 2011 to Final Office Action mailed Feb. 17, 2011", 16 pgs.

"U.S. Appl. No. 11/117,851, Response filed Aug. 25, 2011 to Non Final Office Action mailed May 25, 2011", 15 pgs.

"U.S. Appl. No. 11/117,851, Final Office Action mailed Dec. 6, 2010", 17 pgs.

"U.S. Appl. No. 11/117,851, Non Final Office Action mailed May 25, 2011", 24 pgs.

"U.S. Appl. No. 11/117,851, Response filed Mar. 3, 2011 to Final Office Action mailed Dec. 6, 2010", 15 pgs.

"U.S. Appl. No. 11/118,018, Appeal Brief filed Mar. 11, 2011", 38 pgs.

"U.S. Appl. No. 11/118,018, Final Office Action mailed Dec. 21, 2010", 32 pgs.

"U.S. Appl. No. 11/118,018, Notice of Allowance mailed May 20, 2011", 15 pgs.

"U.S. Appl. No. 11/118,018, Notice of Allowance mailed Aug. 8, 2011", 11 pgs.

"U.S. Appl. No. 11/118,890, Decision on Pre-Appeal Brief Request mailed May 21, 2010", 2 pgs.

"U.S. Appl. No. 11/118,890, Examiner's Answer to Appeal Brief mailed Sep. 3, 2010", 12 pgs.

"U.S. Appl. No. 11/118,890, Reply Brief filed Oct. 28, 2010", 4 pgs.

"U.S. Appl. No. 11/647,979, Advisory Action mailed Aug. 25, 2010", 3 pgs.

"U.S. Appl. No. 11/025,549 Non-Final Office Action mailed on Mar. 24, 2009", 13 pgs.

"U.S. Appl. No. 11/118,018, Non-Final Office Action mailed Mar. 20, 2009", 13 pgs.

"U.S. Appl. No. 11/118,018, Response filed Jun. 19, 2009 to Non Final Office Action mailed Mar. 20, 2009", 14 pgs.

Osdir, "Re: Barracude: Reference Objects in Session/ServletContext", msg#00056, (Nov. 2002).

Pasin, Macia, et al., "High-Available Enterprise JavaBeans Using Group Communication System Support", XP002285985, 1-6, 2001.

"U.S. Appl. No. 11/117,851, Final Office Action mailed Nov. 30, 2011", 27 pgs.

"U.S. Appl. No. 11/647,979, Non Final Office Action mailed Dec. 13, 2011", 10 pgs.

* cited by examiner

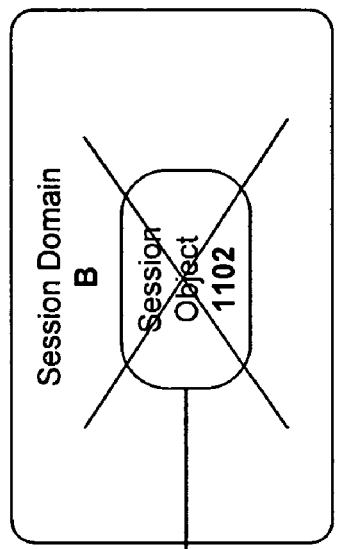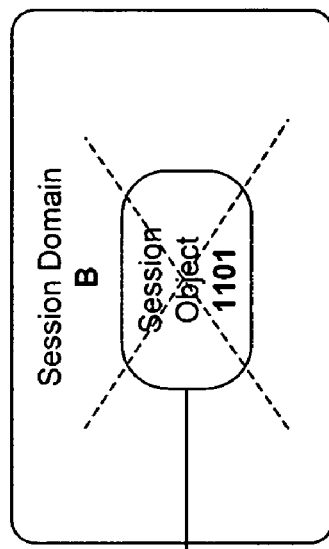
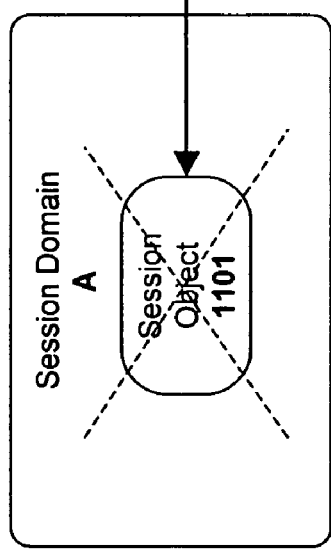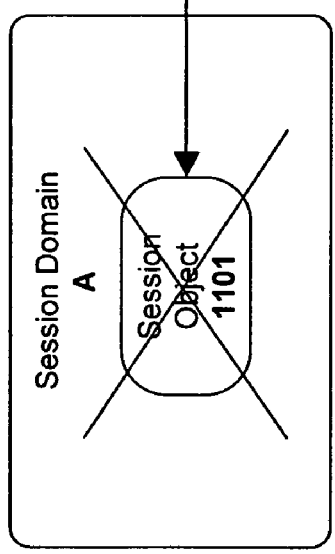
Fig. 11a
Fig. 11b

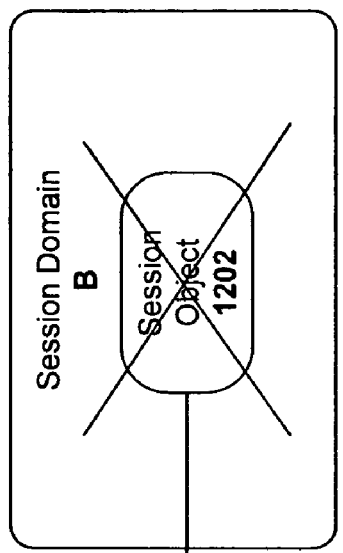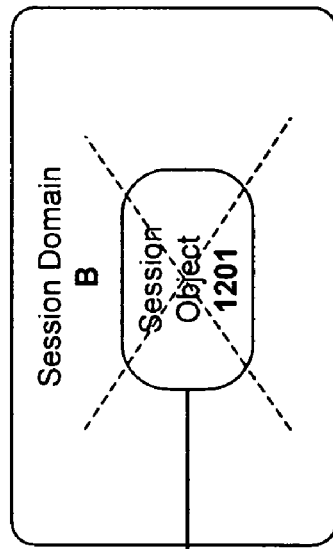
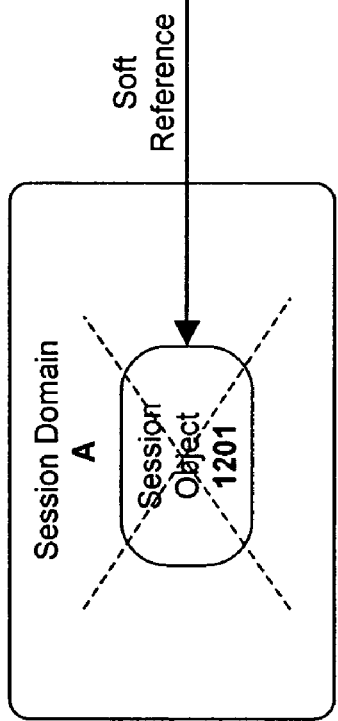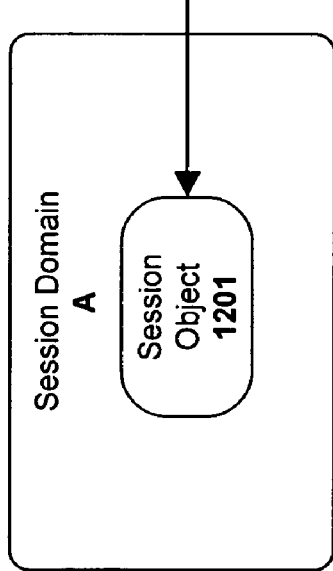
Fig. 12a
Fig. 12b

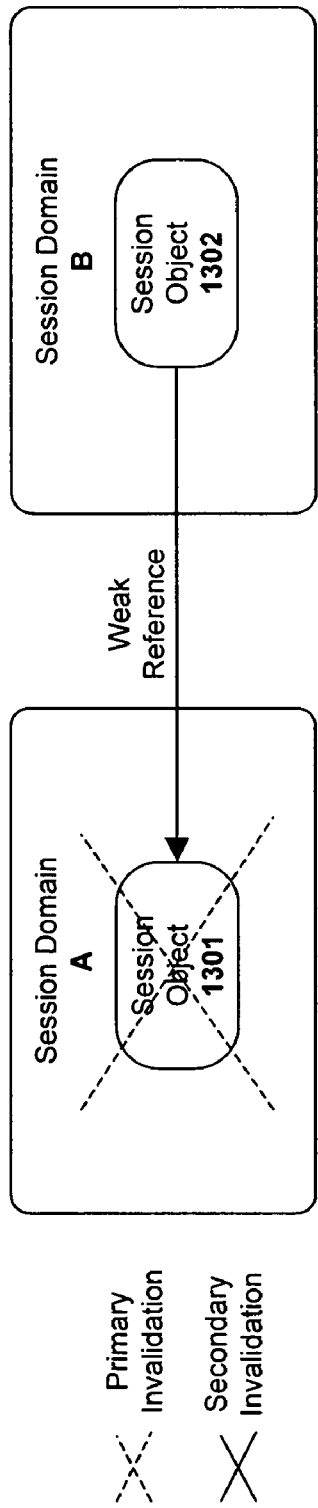
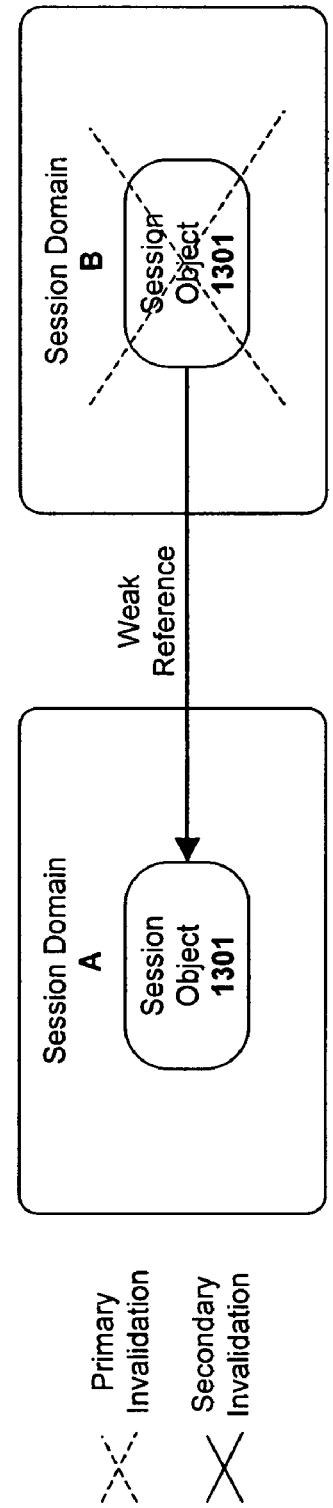

SESSION MANAGEMENT WITHIN A MULTI-TIERED ENTERPRISE NETWORK

BACKGROUND

1. Field of the Invention

This invention relates generally to the field of data processing systems. More particularly, the invention relates to a system and method for managing session data within an enterprise network.

2. Description of the Related Art

Multi-Tiered Enterprise Computing Systems

Traditional client-server systems employed a two-tiered architecture such as that illustrated in FIG. 1a. Applications 102 executed on the client side 100 of the two-tiered architecture are comprised of a monolithic set of program code including a graphical user interface component, presentation logic, business logic and a network interface that enables the client 100 to communicate over a network 103 with one or more servers 101. A database 104 maintained on the server 101 provides non-volatile or "persistent" storage for the data accessed and/or processed by the application 102.

The "business logic" component of the application represents the core program code of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1a become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1b. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logical components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1b may be implemented using a variety of different application technologies at each of the layers of the multi-tier architecture, including those based on the Java 2 Enterprise Edition™ ("J2EE") standard, the Microsoft .NET standard and/or the Advanced Business Application Programming ("ABAP") standard developed by SAP AG. For example, as described below, in a J2EE environment, the business layer 122, which handles the core business logic of the application, is comprised of Enterprise Java Bean ("EJB") components with support for EJB containers. Within a J2EE environment, the presentation layer 121 is responsible for generating servlets and Java Server Pages ("JSP") interpretable by different types of browsers at the user interface layer 120.

J2EE Application Server Architecture

FIG. 2a illustrates a typical J2EE application server 200 in which the presentation layer is implemented by a "Web container" 211 and the business layer is implemented by an Enterprise Java Bean ("EJB") container 201. Containers are runtime environments which provide standard common services 219, 209 to runtime components. For example, the Java Naming and Directory Interface ("JNDI") is a service that provides application components with methods for performing standard naming and directory services. Containers also provide unified access to enterprise information systems 217 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors.

As illustrated in FIG. 2a, each layer of the J2EE architecture includes multiple containers. The Web container 211, for example, is itself comprised of a servlet container 215 for processing servlets and a Java Server Pages ("JSP") container 216 for processing Java server pages. The EJB container 201 includes three different containers for supporting three different types of enterprise Java beans: a session bean container 205 for session beans, a entity bean container 206 for entity beans, and a message driven bean container 207 for message driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

Session Management

An application server 100 manages "session data" associated with each client interaction. The session data defines the current conversational state between the client and the application server. For example, if the user is purchasing books from an online bookstore, the session data may define the current state of the user's "shopping cart" (e.g., the books the user has selected for purchase). Similarly, if the user is logged in to a particular Web portal (e.g., "My Yahoo"), the session data may define the state of the Web pages opened in the user's Web browser.

Different types of session data are maintained at each logical layer of the application server 100. For example, referring to FIG. 2b, in response to a single client 230 request from a Web browser, an HTTP session object 241 (e.g., an instance of javax.servlet.HttpSession) containing HTTP session data is managed within the Web container 240 and (depending on the type of application) multiple session beans 251-253 may be managed within the EJB container 250. Additional HTTP session objects 242 and session beans 254-255 may be managed concurrently to define the conversational state with additional clients 231 for the same application (e.g., the shopping cart application) or other applications (e.g., a "search"

application). Thus, the state of any given set of applications such as the user's shopping cart may be spread across multiple containers.

SUMMARY

A system and method are described in which session objects are organized and managed within a structured hierarchy of session object storage units, referred to herein as "session domains." The session domains store session objects sharing one or more related characteristics. In one embodiment, a separate hierarchy of session domains is implemented within each layer of an enterprise application server. For example, in a Java 2 Enterprise Edition ("J2EE") environment, a separate set of hierarchically-arranged session domains are generated for the EJB container, the Web container and the portal container. In addition, in one embodiment of the invention, the lifecycles of each of the session objects are managed based on the relationships between each of the session objects. The relationships may either be explicit or implicit. In the latter case, one embodiment of the invention detects the relationship, automatically declares the relationship, and uses the relationship to manage the lifecycle of the related sessions.

BRIEF DESCRIPTION OF THE DRAWINGS

A better understanding of the present invention can be obtained from the following detailed description in conjunction with the following drawings, in which:

FIG. 11 illustrates one embodiment for managing session objects having strong references.

FIG. 12 illustrates one embodiment for managing session objects having soft references.

FIG. 13 illustrates one embodiment for managing session objects having weak references.

DETAILED DESCRIPTION OF PREFERRED EMBODIMENTS

Described below is a system and method for managing session data within a multi-tiered enterprise network. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Cluster Architecture

Figure 3:
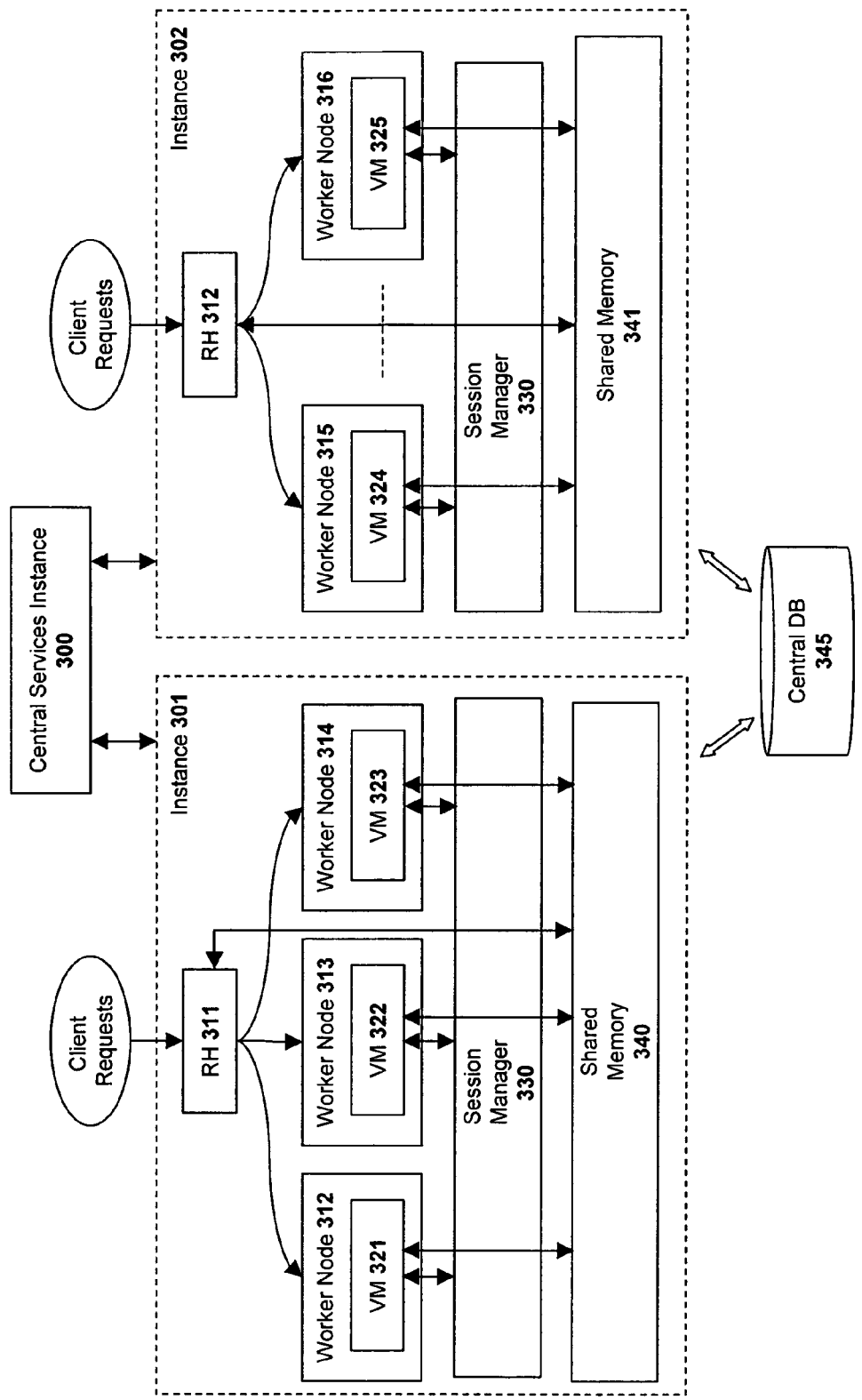
FIG. 3 illustrates a cluster architecture employed in one embodiment of the invention.

A system architecture according to one embodiment of the invention is illustrated in FIG. 3. The architecture includes a plurality of application server instances 301 and 302. The application server instances 301 and 302 each include a group of worker nodes 212-314 and 315-316, respectively, and a request handler 311 and 312, respectively. The application server instances 301, 302 communicate through a central services instance 300 using message passing. In one embodiment, the central services instance 300 includes a locking service and a messaging service (described below). The combination of all of the application server instances 301 and 302 and the central services instance 300 is referred to herein as a "cluster." Although the following description will focus solely on instance 301 for the purpose of explanation, the same principles apply to other instances within the cluster.

The worker nodes 312-314 within instance 301 provide the business and/or presentation logic for the network applications supported by the system. Each of the worker nodes 312-314 within a particular instance may be configured with a redundant set of application logic and associated data, represented as virtual machines 321-323 in FIG. 3. In one embodiment, the request handler 311 distributes service requests from clients to one or more of the worker nodes 312-314 based on the load on each of the servers. For example, in one embodiment, the request handler maintains separate queues for each of the 312-314 in shared memory 340. The request handler 311 fills the queues with client requests and the worker nodes 312-314 consume the requests from each of their respective queues.

The worker nodes 312-314 may be Java 2 Enterprise Edition ("J2EE") worker nodes which support Enterprise Java Bean ("EJB") components and EJB containers (at the business layer) and Servlets and Java Server Pages ("JSP") (at the presentation layer). In this embodiment, the virtual machines 321-325 implement the J2EE standard (as well as the additional non-standard features described herein). It should be noted, however, that the embodiments of the invention described herein may be implemented in the context of various different software platforms including, by way of example, Microsoft NET platforms and/or the Advanced Business Application Programming ("ABAP") platforms developed by SAP AG, the assignee of the present application.

In one embodiment, communication and synchronization between each of the instances 301, 302 is enabled via the central services instance 300. As mentioned above, the central services instance 300 includes a messaging service and a locking service. The message service allows each of the servers within each of the instances to communicate with one another via a message passing protocol. For example, messages from one server may be broadcast to all other servers within the cluster via the messaging service (e.g., such as the cache configuration messages described below). Alternatively, messages may be addressed directly to specific servers within the cluster (i.e., rather than being broadcast to all servers). In one embodiment, the locking service disables access to (i.e., locks) certain specified portions of configuration data and/or program code stored within a central database 345. The locking service locks data on behalf of various system components which need to synchronize access to specific types of data and program code. In one embodiment, the central services instance 300 is the same central services instance as implemented within the Web Application Server version 6.3 developed by SAP AG. However, the underlying principles of the invention are not limited to any particular type of central services instance.

In one embodiment, a session management layer 330 is executed within each of the instances 301-302. The session management layer 330 is comprised of the program code, interfaces and data for implementing the various session management techniques described herein. For example, one embodiment of the session management layer 330 manages session objects within session domains as described in detail below (see, e.g., FIG. 4 and associated text).

In addition, unlike prior systems, one embodiment of the invention shares objects across virtual machines 321-325. Specifically, in one embodiment, objects such as session objects which are identified as "shareable" are stored within a shared memory region 340, 341 and are made accessible to multiple virtual machines 321-325. Creating new object instances from scratch in response to client requests can be a costly process, consuming processing power and network bandwidth. As such, sharing objects between virtual machines as described herein improves the overall response time of the system and reduces server load.

In a shared memory implementation, a shared memory area 340, 341 or "heap" is used to store data objects that can be accessed by multiple virtual machines 321-325. The data objects in a shared memory heap should generally not have any pointers or references into any private heap (e.g., the private memory regions/heaps of the individual virtual machines). This is because if an object in the shared memory heap had a member variable with a reference to a private object in one particular virtual machine, that reference would be invalid for all the other virtual machines that use that shared object.

More formally, this restriction can be thought of as follows: For every shared object, the transitive closure of the objects referenced by the initial object should only contain shared objects at all times. Accordingly, in one implementation of the server 200, objects are not put into the shared memory heap by themselves—rather, objects (such as the session objects described herein) are put into the shared memory heap in groups known as "shared closures." A shared closure is an initial object plus the transitive closure of all the objects referenced by the initial object.

Session Management within a Multi-Tiered Enterprise Network

A. Common Session Management

Figure 2A:
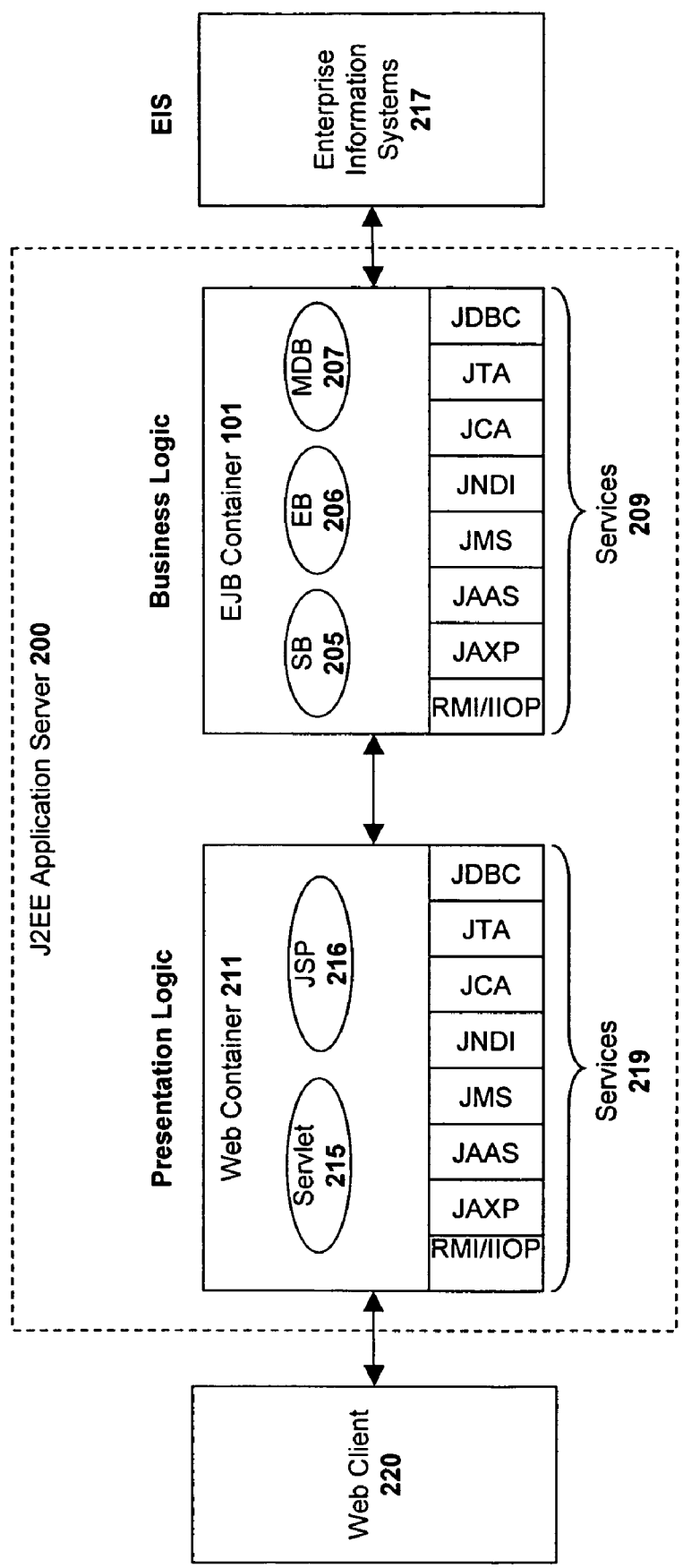
FIG. 2a illustrates a multi-tiered application server architecture according to the Java 2 Enterprise Edition ("J2EE") standard.
Figure 2B:
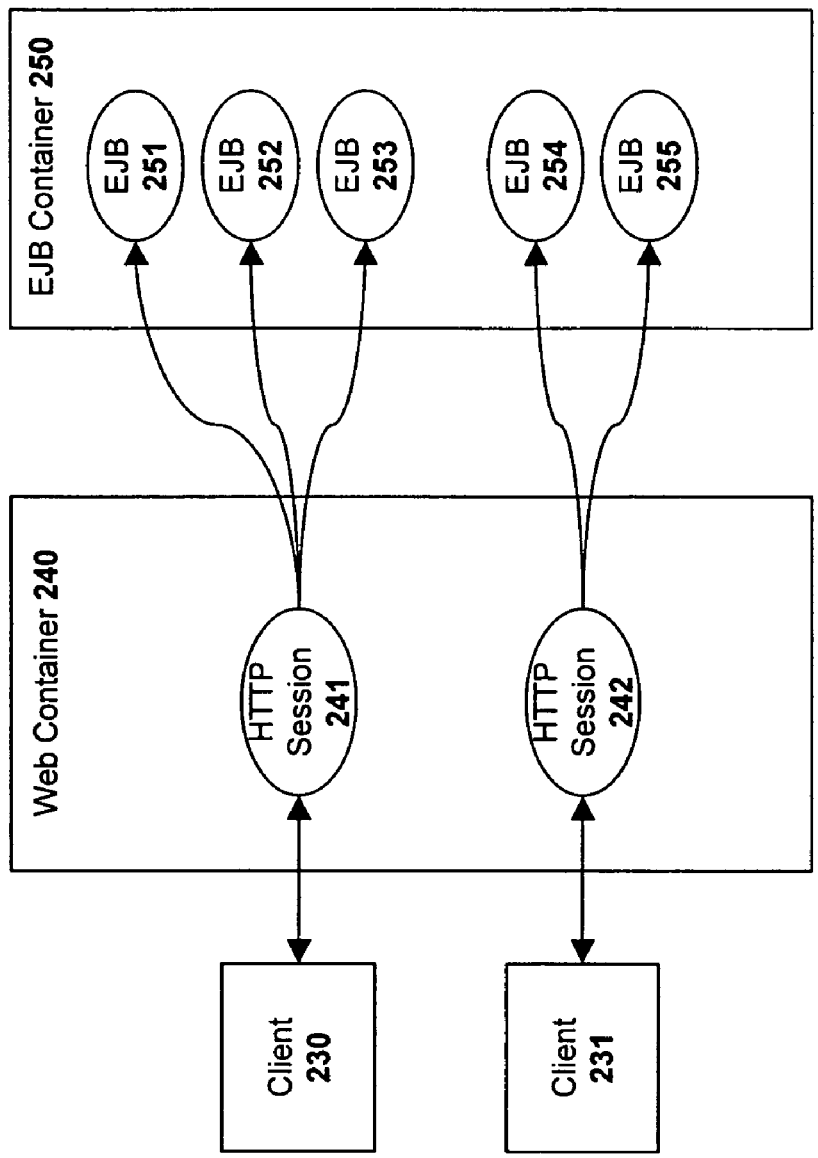
FIG. 2b illustrates different types of session data maintained within a multi-tiered enterprise architecture.

As described above with respect to FIG. 2b, multiple related session objects may be managed within different tiers of an application server in response to a single client request, or series of client requests. Moreover, a single application may support several concurrent client sessions, resulting in several sets of session objects for each client.

Figure 4:
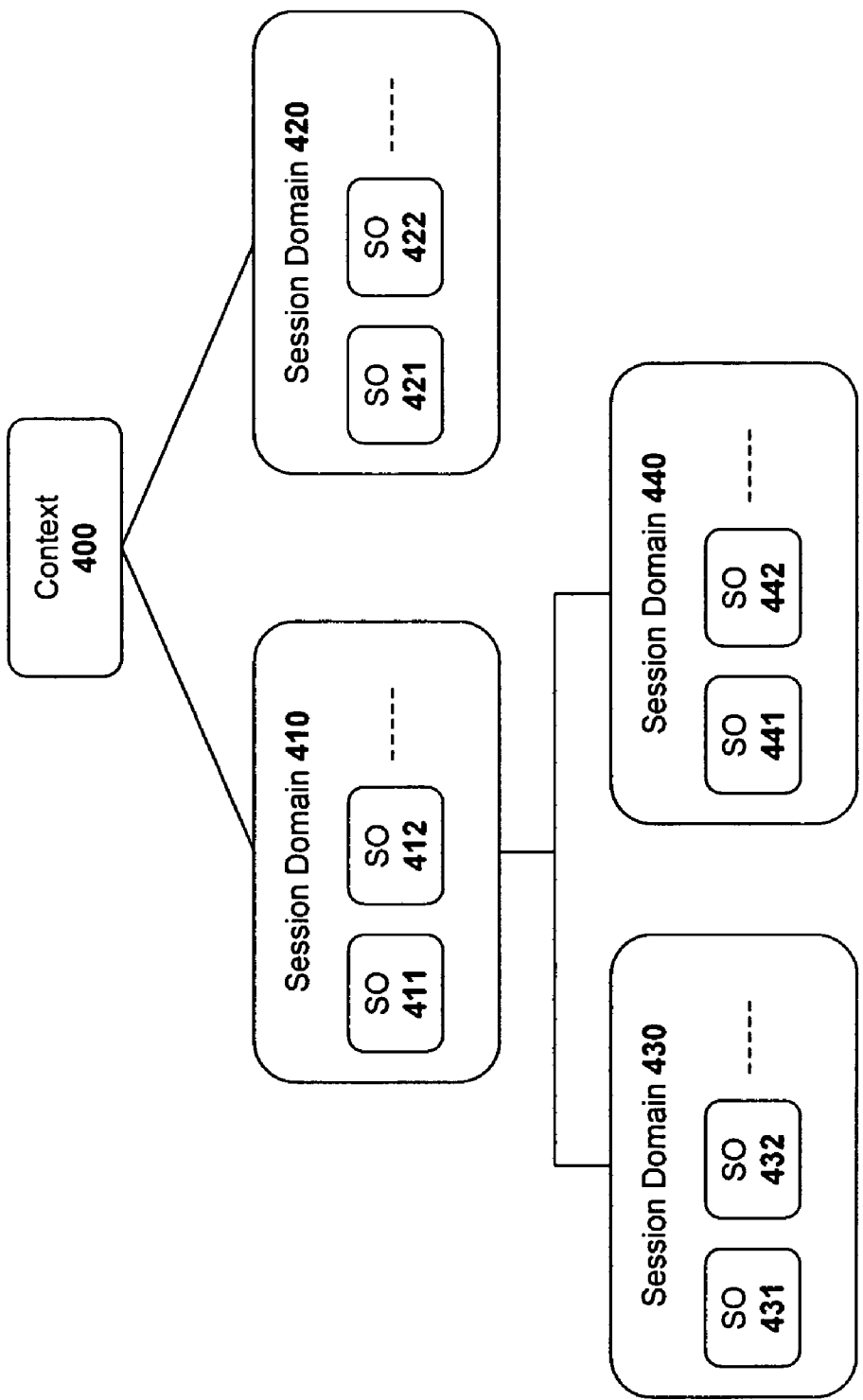
FIG. 4 illustrates a session domain hierarchy according to one embodiment of the invention.

One embodiment of the session management layer 330 employs a hierarchical structure for storing different types of related session data within each enterprise application (e.g., HTTP sessions, session EJBs, etc). In particular, as illustrated in FIG. 4, one embodiment of the session management layer groups related session objects within a logical hierarchy. At the top of the hierarchy is a session context object 400. "Session domains" are the base configurable objects within the session hierarchy and are positioned beneath the session context 400. The session domains represent abstract storage units for sessions that have similar characteristics (e.g., similar life cycles, applications, etc).

In the example shown in FIG. 4, session objects 411 and 412 are managed within session domain 410, and session objects 421 and 422 are managed within session domain 420. Both session domains 410 and 420 are positioned directly beneath the session context 400. In one embodiment, each session domain 410 and 420 contains session objects related to different applications. For example, session domain 410 may contain session objects related to a "shopping cart" application and session domain 420 may contain session objects related to a "calculator" application.

Two additional session domains 430 and 440 are logically positioned beneath session domain 410 within the hierarchy. In one embodiment, these session domains 430 and 440 include session objects 431, 432 and 441, 442, respectively, from the same application associated with session domain 410. Returning to the previous example, if session domain 410 is associated with a shopping cart application, session domains 430 and 440 include session objects related to the shopping cart application.

Grouping session objects for an application within the same session domain provides a consistent, logical way to manage session data. For example, as describe below with respect to FIG. 7, different session policy and configuration parameters may be applied to each session domain such as, for example, session timeout periods and different storage implementations (e.g., shared memory, persistent storage, . . . etc).

In one embodiment, a different session context 400 and associated hierarchy of session domains is maintained by the session management layer 330 for each layer of the application server. This embodiment will be described using the example illustrated in FIG. 5 in which a plurality of session objects are managed for two different applications, identified as applications "A" and "B." The conversational state between client 530 and application A is maintained via three session bean objects 501-503 within the EJB container 542; an HTTP session object 511 within the Web container 540; and two portal session objects 520-521 within the enterprise portal container. Similarly, the conversational state between client 531 and application A is maintained via two session bean objects 504, 506, one HTTP session object 512, and one portal session object 522. Finally, the conversational state between client 532 and application B is maintained via two session bean objects 507-508, one HTTP session object 513, and one portal session object 523.

In the illustrated example, session bean objects 501 and 504 are instances of a particular session bean, "EJB A," and session bean objects 502 and 506 are instances of another session bean, EJB B. Session bean objects 503, 507 and 508 are instances of session beans C, D and E, respectively.

In one embodiment, the enterprise portal container 541 is built on top of the Web container 540. As illustrated, a single HTTP session object 511 may be related to multiple portal session objects 521, 521, which store user-specific session data for a plurality of user-specific Web content (e.g., Web pages) generated during the session. When a user logs in to a Web server, for example, multiple user-specific Web pages may be generated in response to client requests and opened in different windows of the client's Web browser. Thus, a single HTTP session object 511 is managed within the Web container 540 and separate portal session data related for each individual window of the user's browser is stored within the portal session objects 520-521. Said another way, the HTTP session object 511 manages session data related to the entire user session with the application server, whereas the portal session objects store session data for specific pages generated during the session (e.g., "My Yahoo" pages on the "Yahoo" Website).

Figure 5:
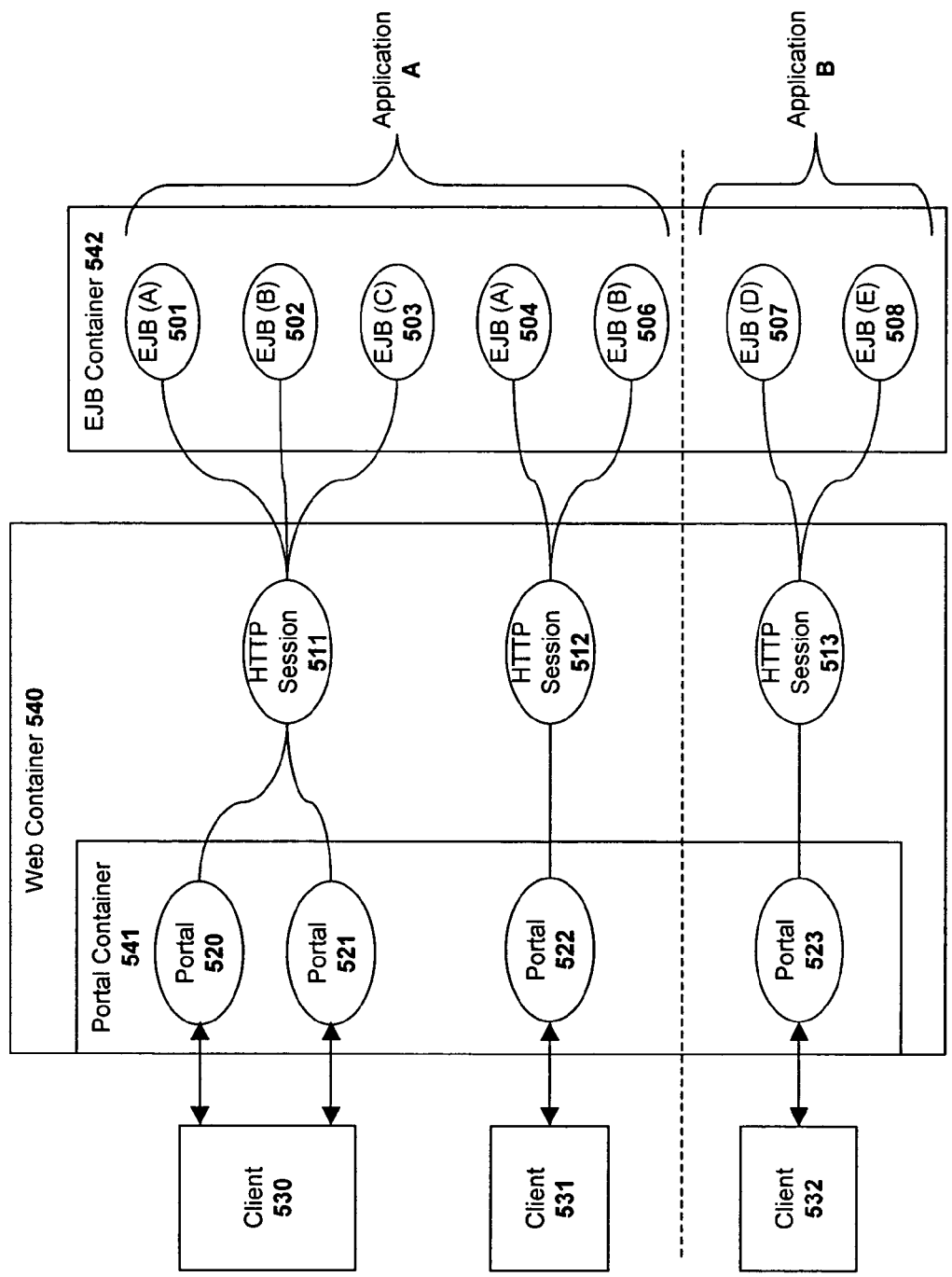
FIG. 5 illustrates an exemplary set of related session data managed at various different layers of an enterprise architecture.
Figure 6A:
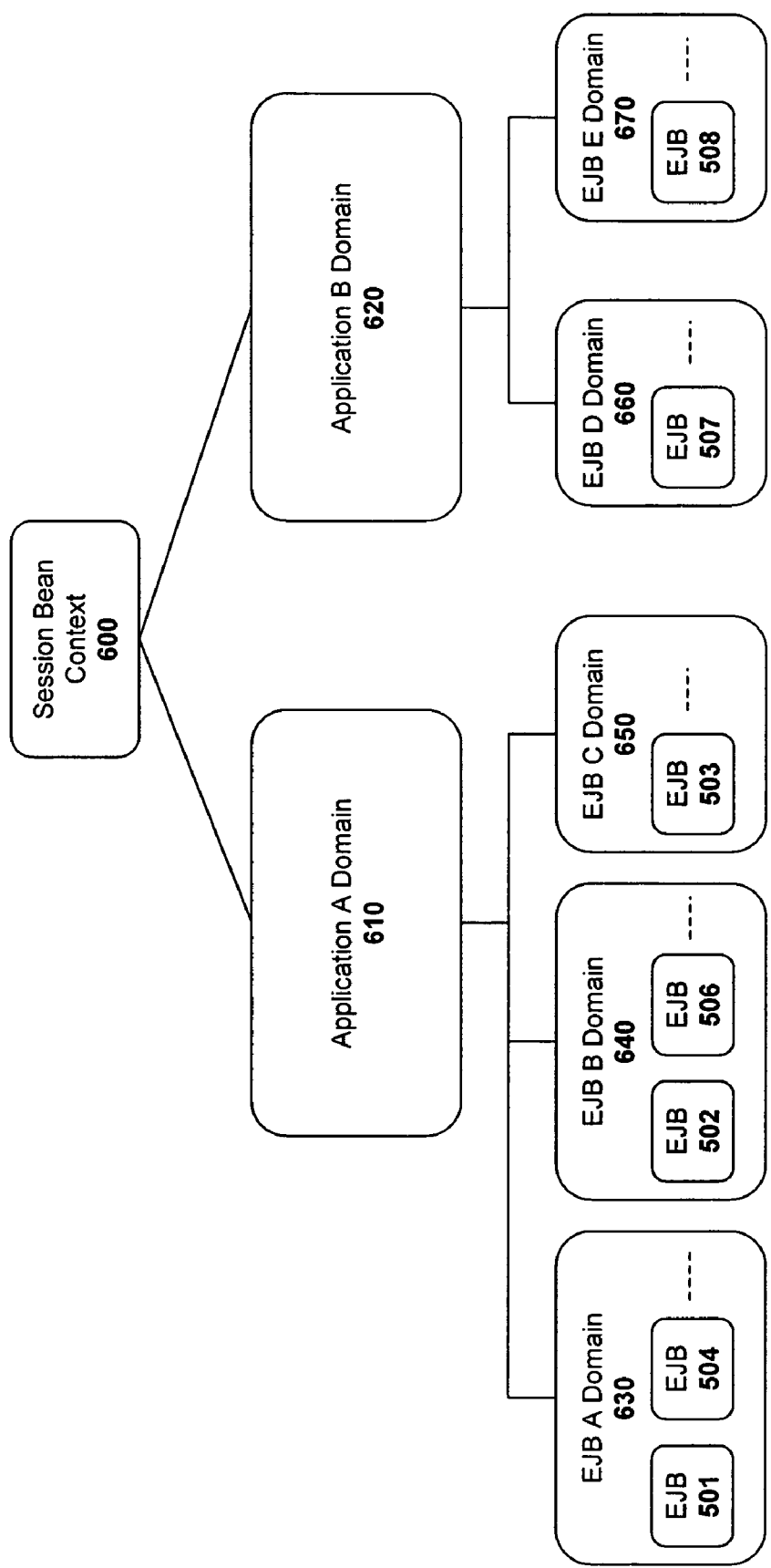
FIGS. 6a-c illustrate session domain hierarchies associated with the exemplary set of session data shown in FIG. 5.
Figure 6B:
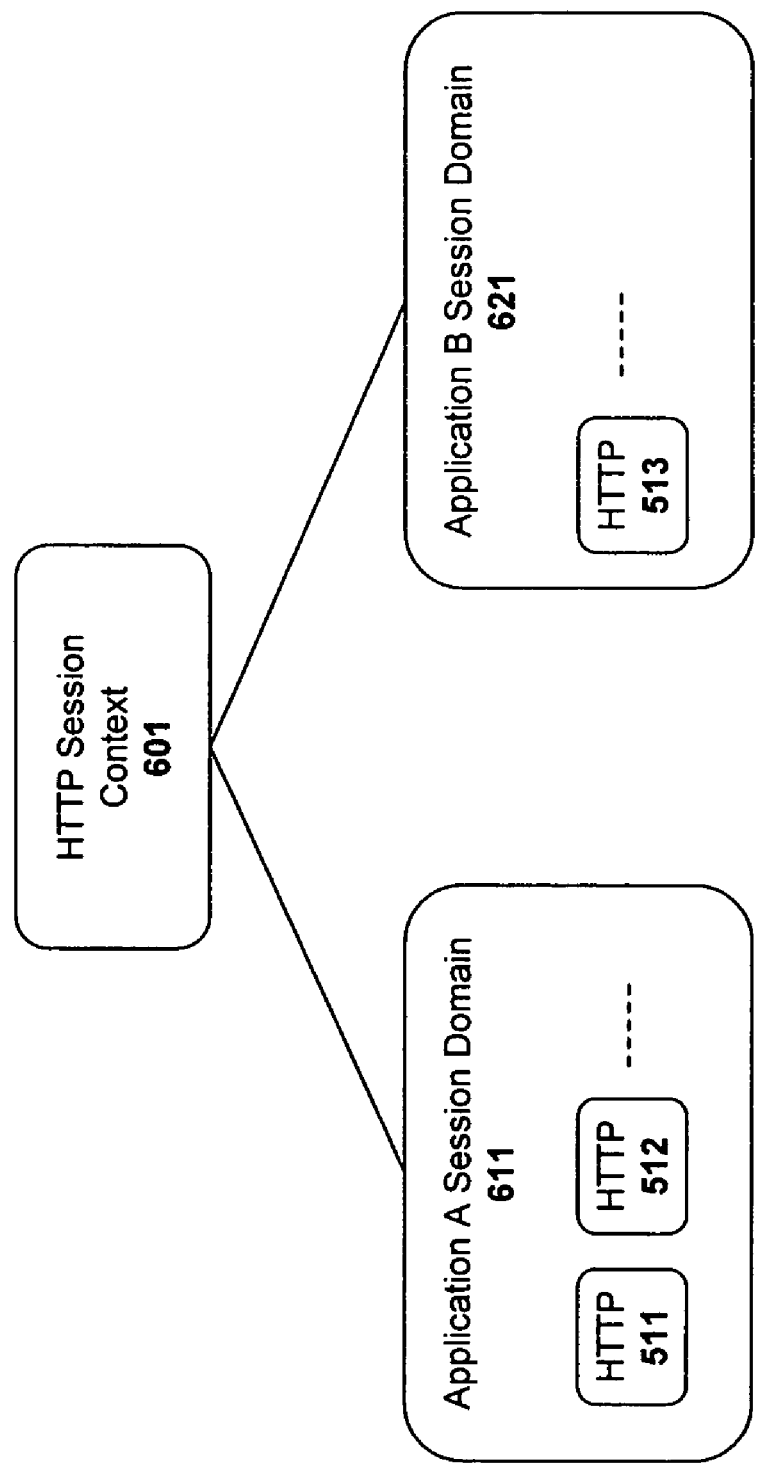
Figure 6C:
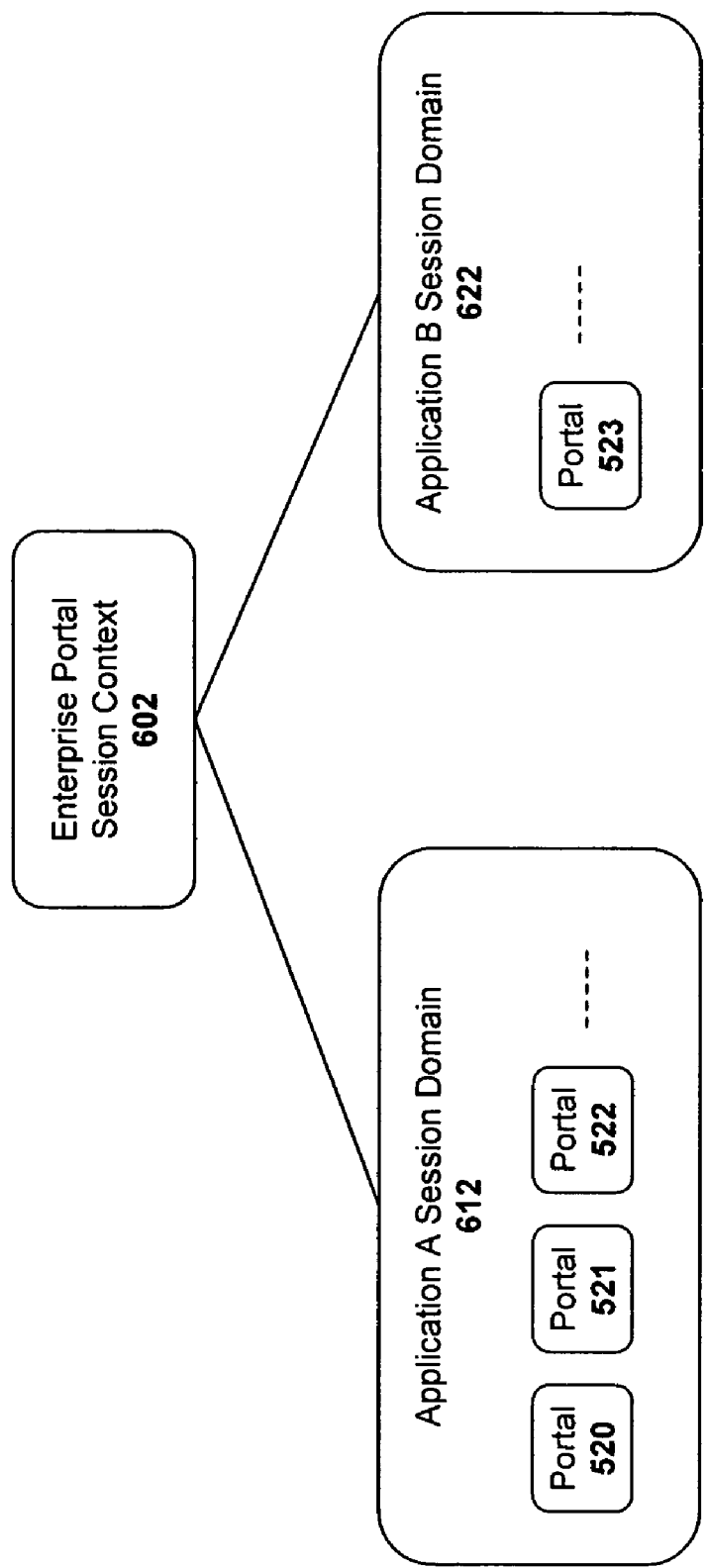

As illustrated in FIGS. 6a-c, each different type of session object shown in FIG. 5 is managed within a session domain under a different context. For example, as illustrated in FIG. 6a, separate session domains 610 and 620, are maintained for applications A and B, respectively, under session bean context 600. A separate EJB session domain is used to store and manage session instances for each session bean of each application. For example, under the application A session domain 610, session domain 630 associated with EJB A stores session objects 501, 504 which are instances of session bean A; session domain 640 associated with EJB B stores session objects 502, 506 which are instances of session bean B; and session domain 650 associated with EJB C stores session objects 503 which are instances of session bean C. Similarly, under the application B session domain 620, session domain 660 associated with EJB D stores session objects 507 which are instances of session bean D, and session domain 670 associated with EJB E stores session objects 508 which are instances of session bean E. Thus, all session beans are managed under the same session bean context 600 and grouped under application-specific and bean-specific session domains, thereby simplifying the management and configuration of similar session objects.

As illustrated in FIG. 6b, separate HTTP session domains 611 and 621 associated with applications A and B, respectively, are managed under an HTTP session context 601. The HTTP session domains store session data associated with each applications' HTTP sessions. For example, HTTP session objects 511 and 512 are stored within the session domain 611 for application A, and HTTP session object 513 is stored within the session domain 621 for application B.

In addition, in one embodiment, illustrated in FIG. 6c, separate portal session domains 612 and 622 associated with applications A and B, respectively, are managed under an application portal session context 602. The portal session domains store portal session objects containing portal data associated with each application. Specifically, portal session objects 520-522 are stored under the portal session domain 612 for application A, and portal session object 523 is stored under the session domain 622 for application B.

Figure 7:
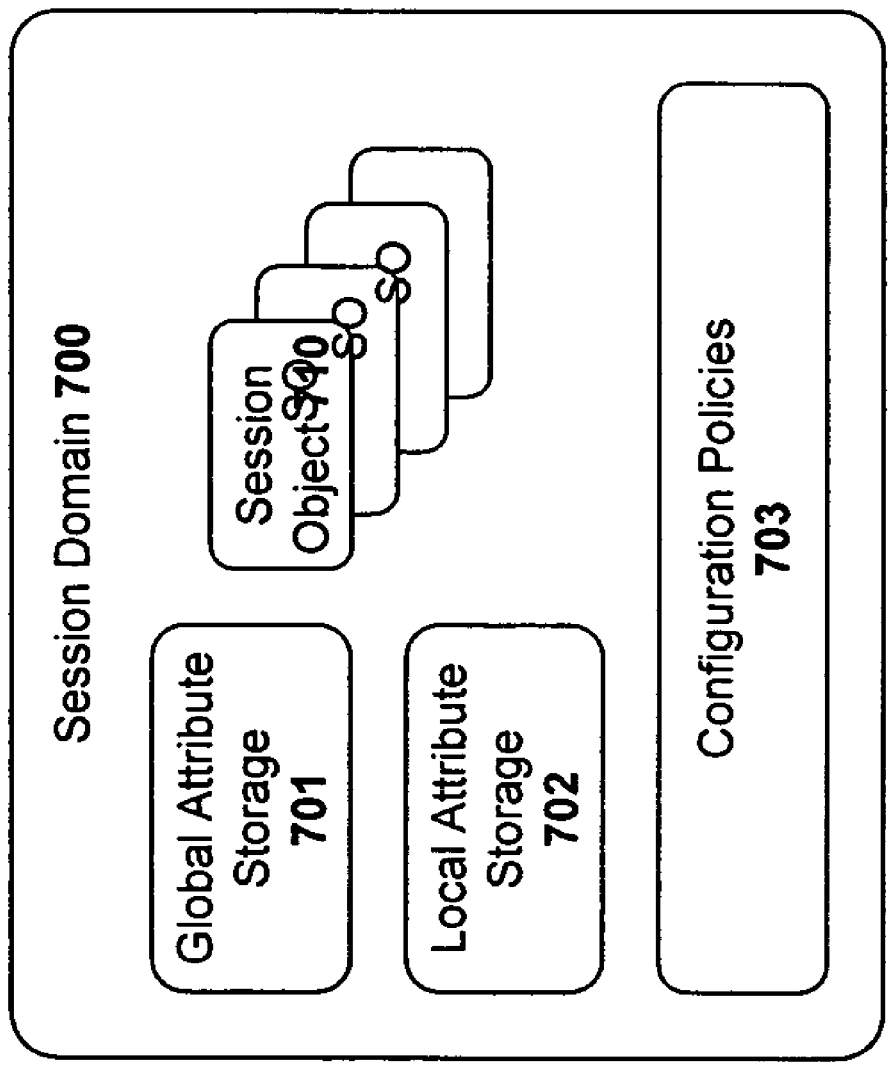
FIG. 7 illustrates a session domain according to one embodiment of the invention.

FIG. 7 illustrates additional details related to the configuration of each session domain 700 according to one embodiment of the invention. Specifically, each session domain 700 includes a set of configuration policy objects 703, a set of local storage attributes 702 and a set of global storage attributes 701.

The configuration policy objects 703 define the behavior of each session domain. In one embodiment, the configuration policies implemented by the policy objects include, but are not limited to, a "thresholds" policy for setting limits on the number of sessions objects which are stored within each domain. For example, one session object may be joined to one or more session requests based on the thresholds policy. In addition, In one embodiment, a session access policy is implemented which allows the application or other entity which created the session domain (the "domain owner") to restrict or otherwise influence session access. For example, the domain owner may prevent multithreaded session access via the session access policy. In one embodiment, the configuration policy 703 further includes a session invalidation policy which defines the behavior of the session object in the case of session invalidation. For example, as described in greater detail below, in one embodiment, transparent session objects are employed under certain conditions. Moreover, inactive sessions may be stored to persistent storage (e.g., the database or file system) and reactivated at a later time in response to subsequent requests.

In one embodiment, a persistence policy is also implemented within the configuration policy objects 703 to define whether persistent storage should be used and, if so, the particular type of persistent storage that should be used. Session persistence types may include, but are not limited to, in-memory session persistence (i.e., session objects within the domain are stored within the memory of a single process); in-memory replication persistence (i.e., session object state is stored within a server process memory and is replicated to other server processes); database-based persistence (i.e., the session objects are stored in the database and may be shared across server processes); file system persistence (i.e., sessions are stored within a directory of the file system and can be shared across processes); and cookie-based persistence (i.e., session data is stored within the client in a cookie). It should be noted, however, that the underlying principles of the invention are not limited to any particular set of configuration properties.

Returning to FIG. 7, the global storage attributes 701 of each session domain 700 define attributes of the session domain which are shared across different virtual machines (e.g., different instances of the session domain implemented on different virtual machines). For example, the global session attributes may specify that all sessions within the particular domain 700 have the same expiration time (e.g., become inactive/invalid after a period of non-responsiveness from a client). By way of another example, EJB application descriptors may be parsed once and shared between each of the EJB domains located under the session bean context 600, and Web application descriptors may be parsed only once and shared between each of the session objects located under the HTTP session context 601. In one embodiment, global storage attributes are used only in a shared memory implementation (i.e., in which virtual machines 321-325 share session objects via shared memory 340-341 as described herein). In one embodiment, global attributes are identified in shared memory using a unique global attribute name.

The local storage attributes 702 of the session domain define session attributes which are specific to each individual virtual machine (i.e., they are container-specific). For example, if a particular virtual machine relies on a socket connection to a particular remote server, then this information may be provided within the local storage attributes. Local storage attributes may also include specific references to files within the file system/database and specific references to database connections. In an embodiment which does not employ a shared memory implementation, all attributes of the session domain 700 are stored within the local storage attributes 702.

The different containers can use the local storage attributes 702 to keep certain attributes banded to each concrete server process. For example the HttpSession includes the method javax.servlet.ServletContext getServletContext( ). However, ServletContext can not be shared between different virtual machines because it maintains references to different resources that are local for the concrete server process. Thus, to enable the application to retrieve the ServletContext from the HttpSession, the Web container binds the ServletContext as a local attribute for the session domain. The getServletContext( ) method is implemented to provide a lookup of this attribute from the SessionDomain. Using this technique, the getServletContext( ) will return different objects based on the server process where the session is activated.

Figure 8:
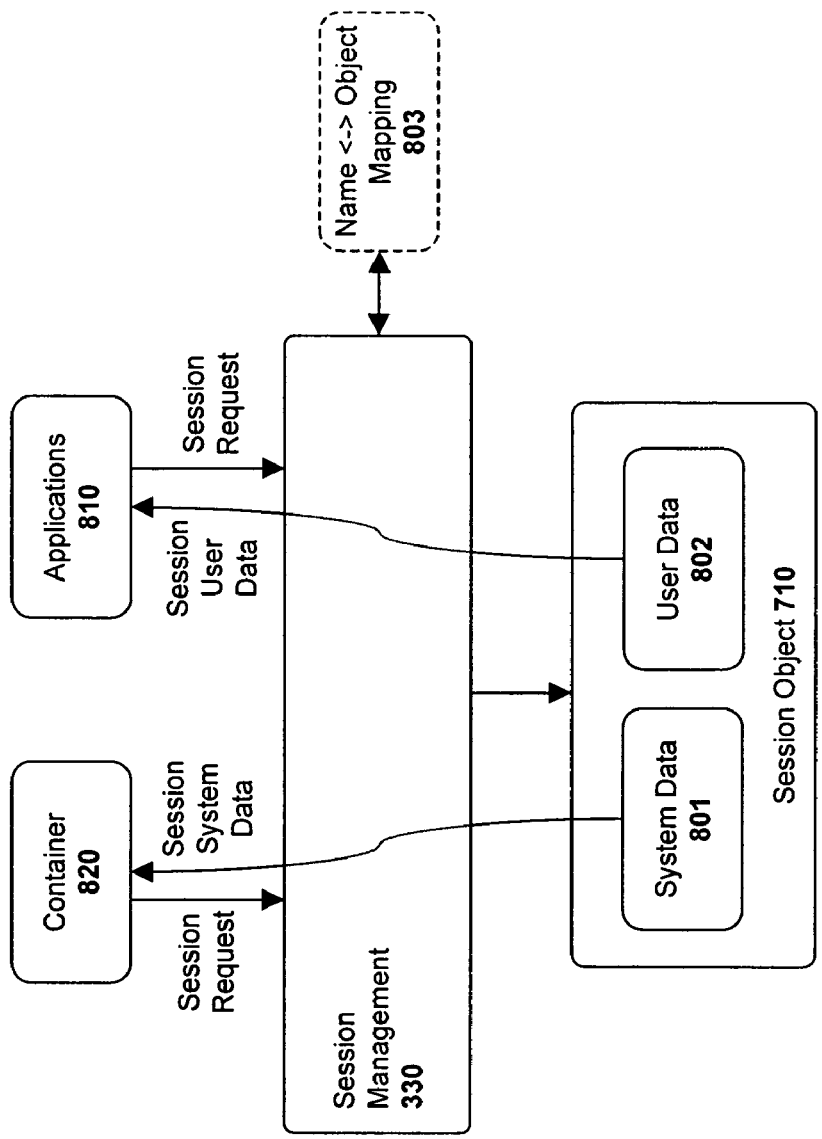
FIG. 8 illustrates a session object according to one embodiment of the invention that includes a system part and a separate user part.

As illustrated in FIG. 8, in one embodiment of the invention, each session object 710 is logically separated into two different sub-parts or sub-objects: a system object 801 for storing system session data and a user object 802 for storing user session data. The system object 801 includes data used by the application container 820 for session identification and session life cycle management (described in greater detail below). For example, the system object 801 includes the time that the session was created and the last time the session was accessed. The application container reads this information to determine whether the session object 710 should move from a valid to an invalid (active state is the state when we have requests to the session) state (e.g., if it has not been accessed by an application for an extended period of time). The system object 801 also includes system data indicating whether the session object is to be stored in persistent storage (e.g., the database or file system) and/or shared memory (e.g., whether the session object is non-shareable or "sticky"), the state of the session (e.g., valid, invalid, transparent, removed), and the session domain ID.

The user object 802 includes user data typically accessed by applications 810 (rather than by the container). This may include, for example, user-specific session data for a particular Web page and/or data related to the current state of the user's browser. In one embodiment, all attributes stored in the HttpSession from the application are stored in the user object. In addition, the instances of each statefull EJB object may also be stored in the user object.

One embodiment of the session management layer 330 relies on the separation between system and user data to improve the efficiency with which the container and/or application accesses the session data. The system object 801 is typically much smaller in size than the user object 802 and is not modified very frequently (although it may be accessed frequently). Thus, in one embodiment, the system object 801 is optimized for read access. For example, the system object 801 may be cached in main memory (shared memory 330 and/or local memory within the server on which the VM is executed) rather than being stored in persistent storage.

By contrast, the user object 802, which is significantly larger than the system object 801, may be stored to persistent storage. In one embodiment, to improve the efficiency with which user session data is accessed from persistent storage, the user session data is separated in the one or more independently-accessible parts called "delta attributes." Because each of the delta attributes can be read independently from other attributes the entire block of system data does not need to be read to retrieve a particular attribute, thereby further improving efficiency. In one embodiment, the delta attributes represent the changes in the user data since the last time the user object was accessed. Reading only changes in the user data rather than all of the user data further improves access time.

In one embodiment, the delta attributes are stored/retrieved in the session using addDelta/getDelta methods of the Session. Any attribute of an object can be stored as a delta attribute in the session object. In one embodiment, the delta attributes are not read from the backend store when the session is activated. Rather, the delta attributes are read only when the client attempts to retrieve them using the getDelta( ) method.

As indicated in FIG. 8, to access session data from the session object 710, both the container 820 and applications 810 generate a session request, identifying the session by its name. In one embodiment, the session management layer 330 maintains a name-object mapping (e.g., within a mapping table) to identify the session object 710 using its name. Once the session object 710 is identified, the session management layer 330 determines which portion of the session object to provide to the requestor based on the type of requestor. For example, in response to session requests from the container 820, the session management layer 330 provides system data from within the system data object 801, whereas in response to session requests from applications 810, the session management layer 330 provides user data from the user data object 802. Thus, in this embodiment, the mechanism for retrieving the correct set of data is transparent to the requester. Of course, in an alternate embodiment, the container 820 and applications 810 may directly access the system data 801 and user data 802, respectively.

In one embodiment of the invention, session objects are managed differently depending on the objects' state. For example, "active" session objects generated in response to a session request are maintained within the local memory (or "heap") of the virtual machine in which the session request originated. However, in a shared memory implementation, when a session object becomes inactive (e.g., due to a lack of interaction with the requestor), it is transferred to shared memory 340-341 so that it may be reused by other virtual machines. Thus, at any given time, session objects 710 from a particular session domain 700 may be stored in local memories of each virtual machine and/or the shared memory (and/or persistent storage). In one embodiment, each session domain 700 is logically separated into a local portion which contains active sessions, and a shared portion, which contains inactive sessions. In a non-shared memory implementation, persistent storage such as the database or file system may be used to store inactive session objects in an analogous manner.

As used herein, an "active" session is one which is currently in use by the application and can be modified. The runtime representation contains all fields and members of the session object, which are directly accessible by the application. In "inactive" session object is one which is not currently being used by the application. Inactive session object are prepared to be written to shared memory and/or persistent storage in their serialized and/or shareable form, respectively. These session objects may be provided with additional member values used to restore the original state of the object after copying from shared memory or deserialization from persistent storage.

Figure 9:
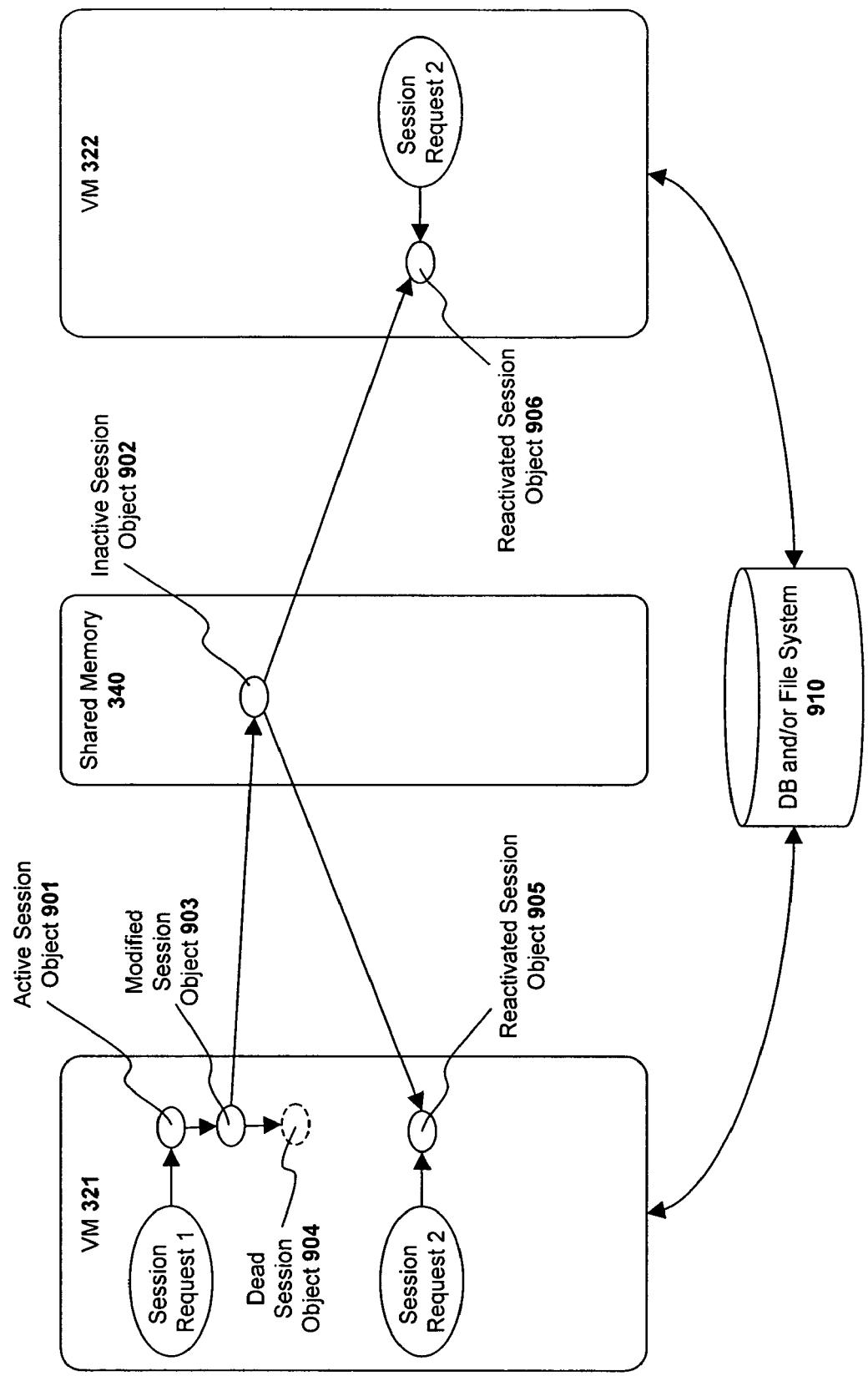
FIG. 9 illustrates a shared memory implementation of one embodiment of the invention.

For the purpose of illustration, a transaction involving a particular session object is illustrated generally in FIG. 9. In response to a first session request, an active session object 901 is generated within virtual machine 321. The session object may then be modified in its active state, resulting in a modified active session object 902. The modified active session object 902 eventually changes state to an inactive session object 903 which is stored within shared memory 340 in a shared memory implementation. Alternatively, in a non-shared memory implementation, the inactive session object 902 may be serialized and stored within the database and/or file system 910, or simply stored within the local memory heap.

Once the inactive session is stored in shared memory, it may be accessed from any virtual machine. For example, in FIG. 9, a second session request is illustrated in both virtual machine 321 and virtual machine 322. In response to either request, the inactive session object is activated and copied back to the virtual machine where the second request originated. The session object may then be accessed and modified again, as described herein. For example, in response to a container session request, only the system data portion 801 of the session object may be accessed, whereas, in response to an application session request, the user data portion 802 of the session object (or portions thereof may be returned, either from shared memory 340 and/or from persistent storage 910.

In one embodiment, if more than one session request is received for the session object, only the first of them activates the session. While the session object is active, subsequent session requests receive the already-activated object (e.g., either through local memory or through shared memory).

As illustrated in FIG. 9, in one embodiment, a local or "dead" copy of the session object 904 is maintained within the virtual machine 321 when the session is inactivated. Because the session object is dead, it may be garbage collected under certain circumstances (e.g., if memory usage reaches a threshold value). Garbage collection is a well known technique for freeing memory in an object-oriented environment such as Java. However, if a second session request is received at the virtual machine 321 before the dead session object is garbage collected then, in one embodiment, the dead session object 904 may be reused and activated once again (i.e., without retrieving the inactive copy from shared memory).

B. Common Session Lifecycle Management

As described above with respect to FIG. 5, an enterprise application typically consists of a variety of different layers that are managed from different containers (e.g., Web container 540, EJB container 542, . . . etc). In response to a single client request, multiple session objects may be created and managed within each of the different layers. For example, in a Java environment, the Web container 540 uses HTTP objects (e.g., javax.servlet.HttpSession objects) to maintain HTTP session data whereas the EJB container 542 uses session beans to maintain the session state of the user.

Session Relationships

Different types of dependencies exist between the session objects within managed within each of the different layers. In one embodiment of the invention, to maintain consistency of user sessions that depend one another, related sessions are managed at a whole. Two general session relations may be defined: (1) explicitly declared session relations in which the relation is created by the container and can be explicitly declared in the session management layer; and (2) implicitly declared session relations in which the relation between sessions is the result of an application's program code. In the latter case, the container processing the request may not be notified that other session objects exist for the currently-processed session.

As an example of an explicitly declared session, the enterprise portal container 541 is built on top of the Web container 540, and provides its own session state for the user (e.g., portal objects 520 and 521). However, the user is identified from the HTTP session object (e.g., HTTP session 511). Thus, to associate the two different types of sessions, the enterprise portal container 541 explicitly declares that the portal session 520,520 is joined to the HTTP session 511.

A common example of an implicitly-declared session relation is between an HTTP session 511 and associated EJB sessions within the EJB container 542. In this case, the reference between the HTTP session and EJB session comes into existence when the application creates EJB objects and stores them in the HTTP session. Thus, the reference is implicitly involved in the HTTP session as a result of application program code. As described in greater detail below, in one embodiment of the invention, the session management layer 330 automatically detects implicit references and, once detected, treats the implicit references for session lifecycle management purposes like explicitly declared weak references.

Because of the different programming models (i.e., HTTP session state is separated from programming logic, whereas the EJB state is part of the logic) the session management layer must provide a mechanism to identify related session data in different session domains. In Web applications, the programming logic is implemented as Servlets or JSPs and session state is stored in different objects called HttpSessions. In the EJB session model, the session state and the programming logic are unified in one object—the EJB instance. In this model, the session state is stored in the fields of the EJB object while the programming logic is implemented in the business methods of the bean.

Session Life Cycles

Figure 10:
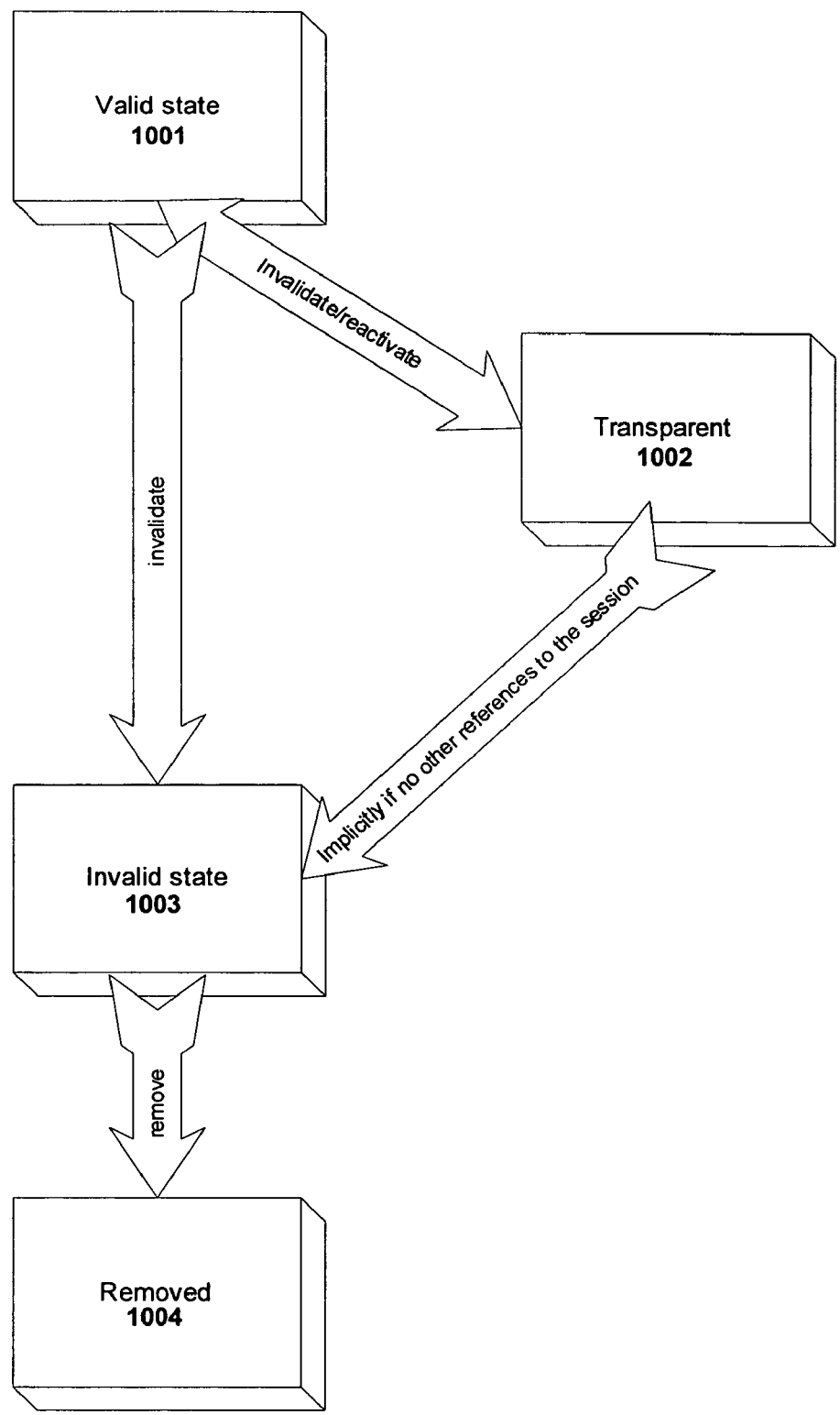
FIG. 10 illustrates state transitions for session objects implemented in one embodiment of the invention.

One embodiment of the invention manages the life cycle of each session object using four states: valid, invalid, transparent, and removed. The transitions between each of these states are illustrated in FIG. 10.

In the valid state 1001 the session object is not expired or explicitly invalidated. In this state the session object is accessible from the application. The valid state includes two sub-states: the active state and the inactive state (described above with respect to FIG. 9). In the active state, the session object is currently being accessed by the application. As described above, in the active state, the session object is stored in the local memory heap where the session is accessed. In the inactive state the session is stored in the backend storage or shared memory 340 and should be activated before usage. In this state, no client requests are associated with the session. In the invalid state 1003 the session is expired or it is explicitly invalidated by the application or container. In this state, the session is accessible to be removed from storage (e.g., via the garbage collection process). In the transparent state 1002, the session object is expired or it is explicitly invalidated, but some other sessions have a reference to it. This is an abstract state where the specific functionality of the session object depends from the containers associated with the session object, as described herein. In the removed state 1004, the session object is not available in the system (i.e., it has been removed by the garbage collection process).

Session Stickiness

The "stickiness" of a session object indicates that the session object cannot be shared with other virtual machines (i.e., the object has an affinity to the server process of its virtual machine). As mentioned above, the stickiness is related to the inactive state of the session and is used to determine the possibility to activate the session in other server process (i.e., other virtual machines). Because it cannot be shared, all session requests associated with a sticky session are performed in the same server process.

In one embodiment, the stickiness of a session object is temporarily defined. The session may be sticky for some time period and may subsequently transition to "non-sticky" (i.e., shareable). In one embodiment, transitions between sticky and non-sticky managed by the application. In general, a session object is sticky if it references resources which are local to the server instance on which it resides (and, therefore, cannot be migrated to another instance). For example, a particular virtual machine implementation may reference a specific socket connection to a remote server. In this case, the session object would need to run only on the particular virtual machine to be provided with access to the remote socket connection. The stickiness of a session object may also result from specific references to files within the file system/database and specific references to database connections. In sum, any function which cannot be performed outside of the local virtual machine may cause a session object to become "sticky."

In one embodiment, in order to maintain a consistent user session state spread over several containers, the sticky attribute of each object is managed simultaneously for all related sessions. As a general rule, a session which is related to other sessions is sticky if the session itself is sticky or if one of the session objects which references it is sticky. This principle is consistent with the underlying techniques described herein for object sharing across multiple virtual machines (see, description of "shared closures").

Managing Session's Relationships

One embodiment of the session management layer 330 manages the state of a session object based on changes in state of related session objects. A distinction here is made between explicitly declared session's relations and implicitly declared session relations.

Explicitly Declared Relations

A session object's relation to other session objects may be declared from session to session. One embodiment of the invention employs three reference types defining the relationships between sessions: strong references, soft references, and weak references.

In one embodiment of the invention, if one of two sessions has a "strong" reference to the other of the two sessions, then each of the two sessions share the same life cycle. As a result, if one of the sessions goes to the invalid state, then the other session will also go to the invalid state.

Figure 1A:
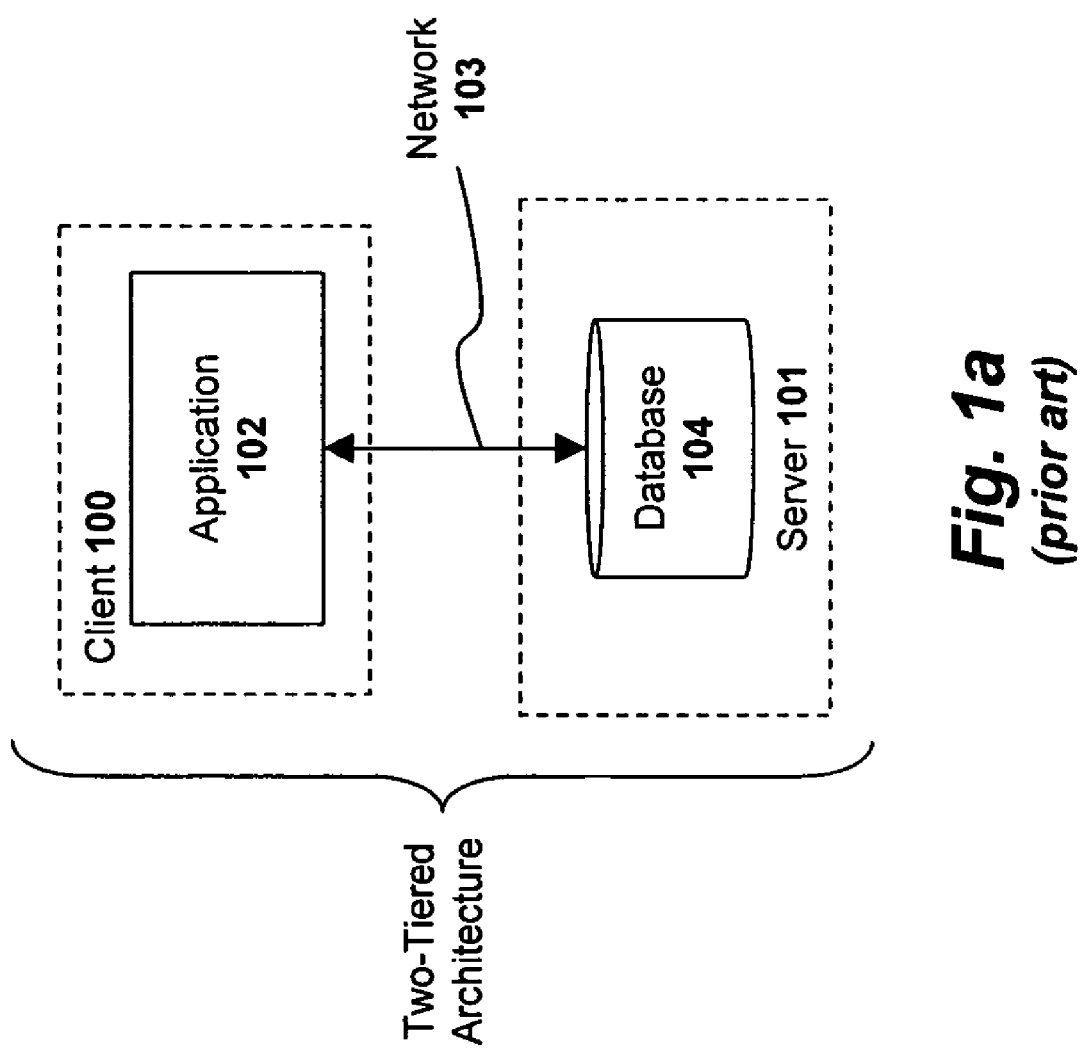
FIG. 1a illustrates a traditional two-tier client-server architecture.
Figure 1B:
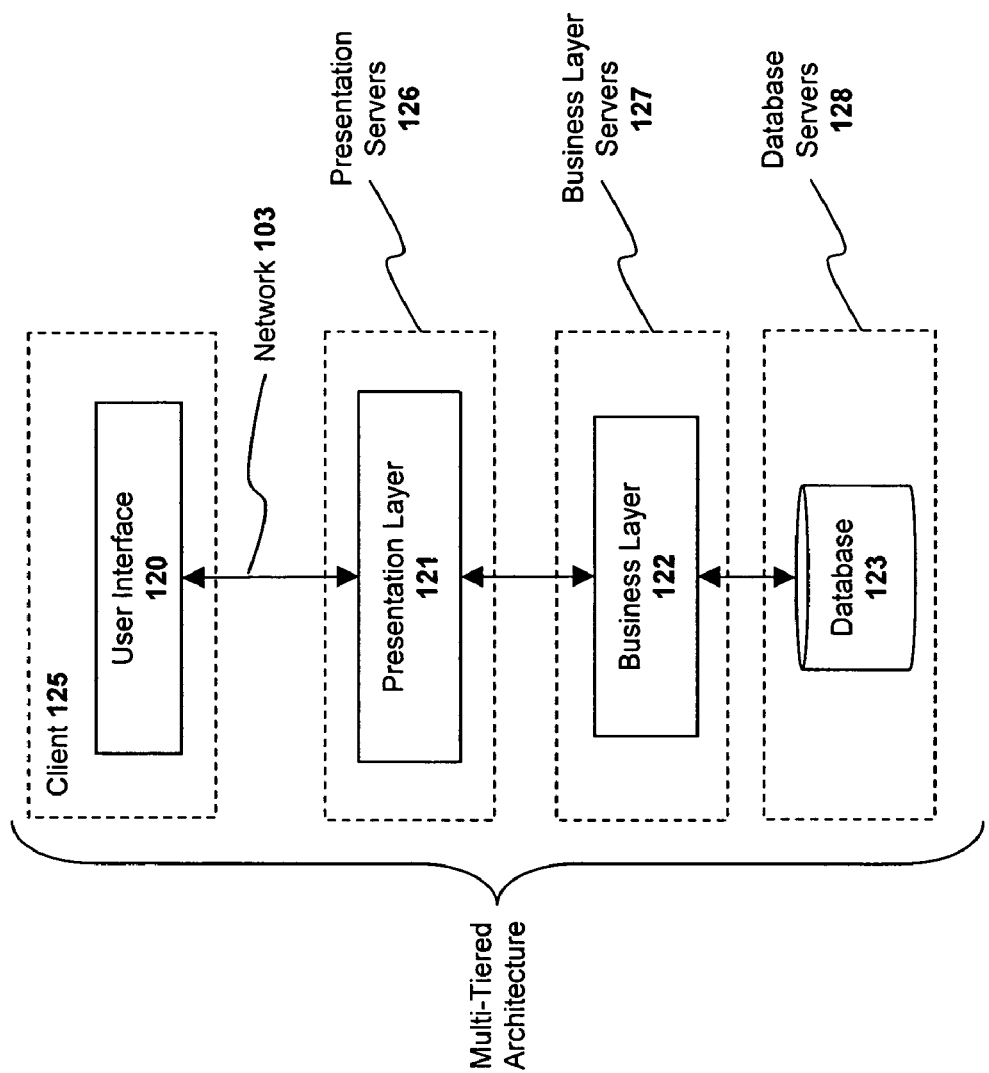
FIG. 1b illustrates a prior art multi-tier client-server architecture.

This is illustrated in FIGS. 1a-b which show session a object 1102 within session domain B with a strong reference to a session object 1101 in session domain A. As an example, session object 1102 might represent EJB object 501 within the EJB container 542 and session object 1101 might represent HTTP session object 511 within the Web container 540. In this case, if the HTTP session object 511 is invalidated, then the related EJB session object 501 should also be invalidated, as shown in FIG. 11a. Conversely, if the HTTP session object 511 is invalidated, then the related EJB session object 501 should also be invalidated, as shown in FIG. 11b. Obviously, session objects that have only strong references cannot be in the "transient" state.

Referring now to FIGS. 12a-b, in the case of a "soft" reference, the referent session object 1201 (i.e., the session which is referred to) has its own, independent lifecycle from the session object 1202 that refers to it. By contrast, the lifecycle of the session object 1202 containing the reference follows the lifecycle of the referent session object 1201 (but doesn't influence it). Thus, if the referent session object 1201 is invalidated, all sessions that have a soft reference to it, such as session object 1202, will be invalidated, but if any of the other session objects are invalidated, the referent session object 1201 will still remain in the valid state.

For example, referring again to FIG. 5, portal object 520 may have a soft reference to HTTP session object 511. As a result, if the HTTP session object 511 is invalidated, then the portal session object 520 that references it is also be invalidated. However, if the portal session object 520 is invalidated (e.g., the end user simply closes a window within a the Web browser), then the HTTP session object 511 should typically remain valid, thereby maintaining the user's HTTP session with the Web server.

As illustrated in FIGS. 13a-b, in the case of a "weak" reference, the session objects 1301-1302 have their own, independent life cycle. However, if the referent session object 1201 is invalidated at a time when it is referenced from other valid session objects, it will transition to the transparent state 1002 as illustrated in FIG. 10. When no valid session objects reference the session object 1201, it then transitions to the invalid state 1003.

By way of another example, an HTTP session object 511 may have a weak reference to a portal session object 520 representing, e.g., a window within a Web browser. As a result, if the HTTP session object 511 is invalidated, the portal session object 520 will transition to the transparent state if any other session objects refer to it (e.g., other portal objects such as portal session object 521).

Implicitly Declared Relations

In one embodiment of the invention, if the session management layer 330 detects a reference between one or more sessions that are not explicitly declared, and automatically generates a weak reference between them. In one embodiment, it also marks the weak reference as "automated"—i.e., an additional session attribute used to note that the reference was established automatically from the container. The session management layer uses this attribute to deactivate the session object when container determines that the sessions are no longer connected (e.g., because the other session object has been invalidated). In one embodiment, from a session management point of view, the reference is managed in the same way as an explicitly declared weak reference (described above).

Figure 14:
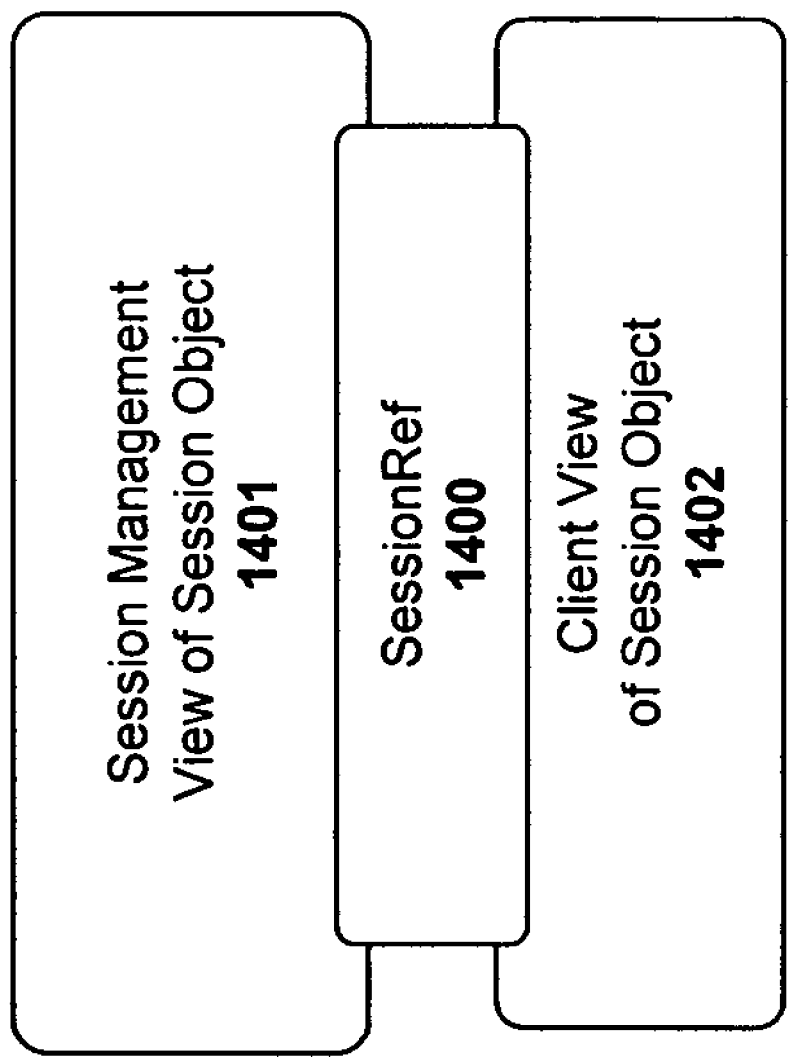
FIG. 14 illustrates a session representation used in one embodiment of the invention.

To automatically detect session dependencies, one embodiment of the session management layer 330 searches for specific objects in the session content during the inactivation process. The availability of one such object will indicate session dependency. The session representation used in this process is illustrated in FIG. 14. The client view 1402 is a thin object wrapper providing access to the session data through the SessionRef object 1400. The session ref is a bridge from client to the session management view of the session. The session management view 1401 of the session is the real session object where the user state is stored.

In one embodiment, if the SessionRef object 1400 is found in the content of session data during the inactivation process, then a weak reference between sessions is created. The reference is removed in some of the next inactivation processes if the same SessionRef object is no longer contained in the session. In one embodiment, the Java Object Serialization mechanism is used to search for SessionRef objects in the object graph of session content.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Certain embodiments described above operate in a shared memory environment. Additional details related to object sharing may be found in, for example, U.S. patent application Ser. No. 10/851,795 entitled "Sharing Objects in Runtime Systems," filed on May 20, 2004, which is assigned to the assignee of the present application.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although many of the embodiments set forth above relate to a Java or J2EE implementation, the underlying principles of the invention may be implemented in virtually any enterprise networking environment. Moreover, although some of the embodiments set forth above are implemented within a shared memory environment, the underlying principles of the invention are equally applicable to a non-shared memory environment.

Accordingly, the scope and spirit of the invention should be judged in terms of the claims which follow.

What is claimed is:

1. A method comprising:
generating, using one or more processors, a plurality of session objects at an application server in response to client requests, the session objects storing session data defining a state of interaction with each of a respective plurality of clients;
defining a structured hierarchy of session domains within the application server, the session domains to organize session objects having one or more related characteristics;
grouping, using the one or more processors, related session domains within one of a plurality of hierarchy levels based on the one or more related characteristics of each of the session objects; and
defining a configuration policy for each of the session domains, the configuration policy including parameters for managing session objects within each session domain, the defining the configuration policy also including defining:
a set of local storage attributes for each of the session domains, the local storage attributes defining storage parameters for storing the session objects within a virtual machine on which the session objects are originally created and executed; and
a set of global storage attributes for each of the session domains, the global storage attributes defining storage parameters for storing the session objects within a shared memory accessible by multiple local virtual machines.

2. The method as in claim 1 wherein defining further comprises:
generating a separate hierarchy of session domains for each of a plurality of layers within the application server.

3. The method as in claim 2 wherein the layers include an enterprise java bean ("EJB") container.

4. The method as in claim 3 wherein defining further comprises:
generating a separate session domain for each session bean within the EJB container.

5. The method as in claim 1 wherein defining further comprises:

generating a separate set of hierarchies of session domains for each of a plurality of applications executed by the application server.

6. The method as in claim 5 wherein generating the separate set of hierarchies of session domains further comprises:
generating a separate hierarchical tree of session object storage units for each of a plurality of layers within the application server.

7. The method as in claim 1 wherein the session domains represent abstract storage units for session objects that have similar characteristics, the session domains are organized within a hierarchy under a session context.

8. The method as in claim 1 wherein the configuration policy includes an indication as to how long each of the session objects will remain in an active state following a client interaction.

9. The method as in claim 1 wherein one of the characteristics used to group the session objects is that each of the session objects exists in a same application server layer for a same application.

10. The method as in claim 1 further comprising:
subdividing each of the session objects into a user part and a system part, the user part to store user data associated with each session and the system part to store session management data.

11. The method as in claim 10 further comprising:
receiving session requests from applications and a container, the requests associated with a particular session object;
providing only the user part of the session object in response to session requests from applications; and
providing only the system part of the session objects in response to session requests from the container.

12. The method as in claim 10 further comprising:
storing the user part in a first storage location within the application server; and
storing the system part in a second storage location within the application server.

13. The method as in claim 12 further comprising:
optimizing the second storage location for read access relative to the first storage location.

14. A system comprising:
a server including one or more processors and coupled to a network, the one or more processors executing:
a plurality of worker nodes communicatively coupled to the network to serve applications over the network to a plurality of clients, the worker nodes generating a plurality of session objects in response to client requests, the session objects storing session data defining a state of interaction with each of a respective plurality of clients; and
a session manager to,
generate a hierarchy of session object storage units, the session object storage units to store session objects having one or more related characteristics, the session manager to group the session objects within the session object storage units based on the one or more related characteristics of each of the session objects,
define a configuration policy object associated with each of the session object storage units, the configuration policy object including parameters for managing session objects within each session object storage unit,
define a set of local storage attributes for each of the session domains, the local storage attributes defining storage parameters for storing the session objects within a virtual machine on which the session objects are originally created and executed, and define a set of global storage attributes for each of the session domains, the global storage attributes defining storage parameters for storing the session objects within a shared memory accessible by multiple local virtual machines.

15. The system as in claim 14 wherein the session manager generates a separate hierarchy of session object storage units for each of a plurality of layers within an enterprise application server.

16. The system as in claim 15 wherein the layers include an enterprise java bean ("EJB") container.

17. The system as in claim 16 wherein generating further comprises:
generating a separate session object storage unit for each session bean within the EJB container.

18. The system as in claim 14 wherein generating further comprises:
generating a separate set of hierarchies of session object storage units for each of a plurality of applications executed by an application server.

19. The system as in claim 18 wherein generating the separate set of hierarchies of session object storage units further comprises:
generating a separate hierarchical tree of session object storage units for each of a plurality of layers within an enterprise application server.

20. The system as in claim 14 wherein the session object storage units comprise session domains.

21. The system as in claim 14 wherein the configuration policy object includes an indication as to how long each of the session objects will remain in an active state following a client interaction.

22. The system as in claim 14 wherein one of the characteristics used to group the session objects is that each of the session objects exists in the same application server layer for the same application.

23. The system as in claim 14 further comprising:
subdividing each of the session objects into a user part and a system part, the user part to store user data associated with each session and the system part to store session management data.

24. The system as in claim 23 wherein the session manager receives session requests from applications and a container, the requests associated with a particular session object; provides only the user part of the session object in response to session requests from applications; and provides only the system part of the session objects in response to session requests from the container.

25. The system as in claim 23 wherein the session manager stores the user part in a first storage location within an application server; and stores the system part in a second storage location within the application server.

26. The system as in claim 25 wherein the second storage location is optimized for read access relative to the first storage location.

27. The system as in claim 25 wherein the first storage location comprises persistent storage and wherein the second storage location comprises random access memory.

28. A non-transitory machine-readable storage medium having program code stored thereon which, when executed by a machine, cause the machine to perform the operations of:
generating a plurality of session objects in response to client requests, the session objects storing session data defining a state of interaction with each of a respective plurality of clients;
defining a hierarchy of session object storage units, the session object storage units to store session objects having one or more related characteristics;
grouping the session objects within the session object storage units based on the one or more related characteristics of each of the session objects; and
defining a configuration policy for each of the session object storage units, the configuration policy including parameters for managing session objects within each session object storage unit, the defining the configuration policy including defining;
a set of local storage attributes for each of the session domains, the local storage attributes defining storage parameters for storing the session objects within a virtual machine on which the session objects are originally created and executed; and
a set of global storage attributes for each of the session domains, the global storage attributes defining storage parameters for storing the session objects within a shared memory accessible by multiple local virtual machines.

29. The non-transitory machine-readable storage medium as in claim 28 wherein defining further comprises:
generating a separate hierarchy of session object storage units for each of a plurality of layers within an enterprise application server.

30. The non-transitory machine-readable storage medium as in claim 29 wherein the layers include an enterprise java bean ("EJB") container.

31. The non-transitory machine-readable storage medium as in claim 30 wherein defining further comprises:
generating a separate session object storage unit for each session bean within the EJB container.

32. The non-transitory machine-readable storage medium as in claim 28 wherein defining further comprises:
generating a separate set of hierarchies of session object storage units for each of a plurality of applications executed by an application server.

33. The non-transitory machine-readable storage medium as in claim 32 wherein generating the separate set of hierarchies of session object storage units further comprises:
generating a separate hierarchical tree of session object storage units for each of a plurality of layers within an enterprise application server.

34. The non-transitory machine-readable storage medium as in claim 28 wherein the session object storage units comprise session domains.

35. The non-transitory machine-readable storage medium as in claim 28 wherein the configuration policy includes an indication as to how long each of the session objects will remain in an active state following a client interaction.

36. The non-transitory machine-readable storage medium as in claim 28 wherein one of the characteristics used to group the session objects is that each of the session objects exists in the same application server layer for the same application.

37. The non-transitory machine-readable storage medium as in claim 28 including additional program code to cause the machine to perform the operations of:
subdividing each of the session objects into a user part and a system part, the user part to store user data associated with each session and the system part to store session management data.

38. The non-transitory machine-readable storage medium as in claim 37 including additional program code to cause the machine to perform the operations of:

receiving session requests from applications and a container, the requests associated with a particular session object;

providing only the user part of the session object in response to session requests from applications; and providing only the system part of the session objects in response to session requests from the container.

39. The non-transitory machine-readable storage medium as in claim 37 including additional program code to cause the machine to perform the operations of:

storing the user part in a first storage location within an application server; and storing the system part in a second storage location within the application server.

40. The non-transitory machine-readable storage medium as in claim 39 including additional program code to cause the machine to perform the operations of:

optimizing the second storage location for read access relative to the first storage location.

* * * * *